United States Patent
Nishita

(10) Patent No.: US 12,235,104 B2
(45) Date of Patent: Feb. 25, 2025

(54) MEASUREMENT DEVICE AND METHOD FOR CONTROLLING MEASUREMENT DEVICE

(71) Applicant: Topcon Corporation, Tokyo (JP)

(72) Inventor: Nobuyuki Nishita, Itabashi-ku (JP)

(73) Assignee: Topcon Corporation, Tokyo (JP)

( * ) Notice: Subject to any disclaimer, the term of this patent is extended or adjusted under 35 U.S.C. 154(b) by 887 days.

(21) Appl. No.: 17/310,170

(22) PCT Filed: Feb. 4, 2020

(86) PCT No.: PCT/JP2020/004185
§ 371 (c)(1),
(2) Date: Jul. 23, 2021

(87) PCT Pub. No.: WO2020/162466
PCT Pub. Date: Aug. 13, 2020

(65) Prior Publication Data
US 2022/0090916 A1 Mar. 24, 2022

(30) Foreign Application Priority Data
Feb. 5, 2019 (JP) .................. 2019-018539

(51) Int. Cl.
*G01S 7/48* (2006.01)
*G01B 11/14* (2006.01)
(Continued)

(52) U.S. Cl.
CPC ............ *G01C 15/002* (2013.01); *G01B 11/14* (2013.01); *G01S 7/484* (2013.01); *G01S 17/42* (2013.01); *G01S 17/89* (2013.01)

(58) Field of Classification Search
None
See application file for complete search history.

(56) References Cited

U.S. PATENT DOCUMENTS

| 9,897,436 B2 | 2/2018 | Ohtomo et al. |
| 10,767,991 B2 | 9/2020 | Ohtomo et al. |
| 10,809,360 B2 | 10/2020 | Ohtomo et al. |

FOREIGN PATENT DOCUMENTS

| JP | 2017-009546 A | 1/2017 |
| JP | 2017-215240 A | 12/2017 |

(Continued)

OTHER PUBLICATIONS

International Search Report and Written Opinion mailed Mar. 17, 2020, in connection with International Patent Application No. PCT/JP2020/004185, filed Feb. 4, 2020, 9 pgs. (including translation).

*Primary Examiner* — Hovhannes Baghdasaryan
(74) *Attorney, Agent, or Firm* — Chiesa Shahinian & Giantomasi PC

(57) ABSTRACT

To efficiently and accurately detect coordinates positions of a measurement object formed in a linear shape regardless of a distance from a measurement light emitting unit. The provided survey system includes: a distance measuring unit; a deflecting unit for deflecting a direction of measurement light with respect to a reference optical axis and for scanning with the measurement light with respect to a prescribed center in a circumferential direction; and a calculation control unit which controls the distance measuring unit and the deflecting unit, wherein the calculation control unit detects coordinates of intersection points of a measurement object formed in a linear shape and a scan trajectory of the measurement light, and controls a deflection operation of the deflecting unit so that intervals of the intersection points adjacent to each other are constant intervals on the measurement object.

12 Claims, 17 Drawing Sheets

(51) Int. Cl.
*G01C 15/00* (2006.01)
*G01S 7/484* (2006.01)
*G01S 17/42* (2006.01)
*G01S 17/89* (2020.01)

(56) References Cited

FOREIGN PATENT DOCUMENTS

| | | |
|---|---|---|
| JP | 2018-066571 A | 4/2018 |
| JP | 2018-173346 A | 11/2018 |

MEASUREMENT DEVICE AND METHOD FOR CONTROLLING MEASUREMENT DEVICE

CROSS-REFERENCE TO RELATED APPLICATIONS

This application is a national stage under 35 U.S.C. 371 of International Patent Application No. PCT/JP2020/004185, filed Feb. 4, 2020, which claims priority to Japanese Patent Application No. 2019-018539, filed Feb. 5, 2019, the disclosures of which are incorporated herein by reference in their entirety.

TECHNICAL FIELD

The present invention relates to a measurement device and a method for controlling the measurement device.

BACKGROUND ART

In recent years, laser scanners that acquire point group data are being used to perform distance measurement and geometry measurement in the fields of civil engineering, construction, and the like. With conventional laser scanners, a range of a scan region is set in advance and scan conditions (for example, a scan speed and a light emission frequency) are temporarily set, in which case the entire scan region is scanned under the set scan conditions.

With such a conventional laser scanner, in order to increase scan density (the number of pieces of measurement point data per unit area) of any measured portion, scan density of an entire scan region has to be increased and an enormous amount of scan data has to be acquired. In consideration thereof, in PTL 1, scan data is acquired in an efficient manner by setting a portion that requires high scan density as a localized measurement range and scanning the localized measurement range at high scan density.

CITATION LIST

Patent Literature

[PTL 1] Japanese Patent Application Laid-open No. 2018-66571

SUMMARY OF INVENTION

Technical Problem

In the laser scanner disclosed in PTL 1, a localized measurement range is a portion visually determined by an operator or a portion for which a large number of edges are extracted from image data acquired by an imaging unit. However, when an operator visually sets a localized measurement range, a setting operation to be performed by the operator is both complicated and significantly time-consuming. In addition, when setting a localized measurement range by extracting edges from image data, not only processing of the image data requires both time and processing load but also it is also impossible to efficiently measure only a desired measurement object.

Furthermore, when a measurement object is a measurement object formed in a linear shape such as a rebar used in construction of an architectural structure, based on a measurement result of the laser scanner, the operator has to inspect a direction in which the measurement object is arranged, intervals at which adjacent measurement objects are arranged, and the like, at each position on a plane in which the measurement object is arranged in a quadrille pattern. In consideration thereof, attempts have been made to measure a measurement object formed in a linear shape such as a rebar using a laser scanner which sequentially radiates a distance measuring laser at constant angular intervals in a vertical direction and which is capable of scanning in rotational directions of two axes of the vertical direction and a horizontal direction by rotating a main body in the horizontal direction.

However, since the distance measuring laser is radiated at constant angular intervals in the vertical direction, point density of obtained distance measurement data becomes lower as a distance from the laser scanner to the measurement object increases and, consequently, the measurement object at a position distant from the laser scanner cannot be accurately measured.

The present invention has been made in order to solve the problem described above, and an object of the present invention is to provide a measurement device capable of efficiently and accurately detecting coordinates of each position of a measurement object formed in a linear shape regardless of a distance from a measurement light emitting unit that emits measurement light to the measurement object and to provide a method for controlling the measurement device.

Solution to Problem

According to the present invention, the problem described above can be solved by a measurement device including: a distance measuring unit having a light producing element which produces measurement light, a measurement light emitting unit which emits the measurement light, a light receiving unit which receives reflected measurement light, and a light receiving element which receives the reflected measurement light and generates a light reception signal, the distance measuring unit performing a distance measurement of a measurement object on the basis of a light reception signal from the light receiving element; a deflecting unit which deflects a direction of emission of the measurement light with respect to a reference optical axis and which is capable of performing a scan with the measurement light with respect to a prescribed center in a circumferential direction; and a control unit which controls the distance measuring unit and the deflecting unit, wherein the control unit detects coordinates of intersection points of the measurement object that is formed in a linear shape and a scan trajectory of the measurement light on the basis of a distance measurement result by the distance measuring unit and the direction of emission that is deflected by the deflecting unit, and controls a deflection operation of the deflecting unit so that intervals of the intersection points adjacent to each other are constant intervals on the measurement object.

With the measurement device according to the present configuration, coordinates of intersection points of a measurement object that is formed in a linear shape and a scan trajectory of measurement light are detected by the control unit on the basis of a distance measurement result by the distance measuring unit and a direction of emission that is deflected by the deflecting unit. In addition, the control unit controls a deflection operation of the deflecting unit so that intervals of the intersection points adjacent to each other are constant intervals on the measurement object. Since intervals on the measurement object between intersection points of which coordinates are detected are constant intervals, coordinates of the measurement object can be obtained at a constant point density regardless of the distance from the measurement device to the measurement object. Therefore, coordinates of each position of the measurement object can be efficiently and accurately detected.

In the measurement device according to the present invention, preferably, the measurement object is formed so as to extend in a linear shape, and the control unit controls the deflection operation of the deflecting unit so that the prescribed center is arranged on a straight line connecting a pair of the intersection points of the measurement object and the scan trajectory of the measurement light.

With the measurement device according to the present configuration, a deflection operation of the deflecting unit is controlled so that the prescribed center is arranged on a straight line connecting a pair of the intersection points of the measurement object and the scan trajectory of the measurement light. Therefore, a state where a center of the scan trajectory of the measurement light tracks the measurement object can be reliably maintained.

In the measurement device according to the present invention, preferably, the control unit controls the deflection operation of the deflecting unit so that a scan trajectory of the measurement light has an elliptical shape with a minor axis in a direction connecting the pair of intersection points and, at the same time, the minor axis has a length in accordance with an inclination angle formed between a straight line connecting the pair of intersection points and the measurement light.

With the measurement device according to the present configuration, since the minor axis of the elliptical shape that is the scan trajectory of the measurement light has a length in accordance with an inclination angle formed between a straight line connecting the pair of intersection points and the measurement light, intervals of adjacent intersection points can be made constant intervals on the measurement object regardless of an inclination angle formed between the direction of emission of the measurement light and the direction in which the measurement object extends.

In the measurement device according to the present invention, preferably, the control unit controls the deflection operation of the deflecting unit so that a scan trajectory of the measurement light has an elliptical shape with a minor axis being a normal direction of an apparent plane including the measurement object and, at the same time, the minor axis has a length in accordance with an inclination angle formed between the plane including the measurement object and the measurement light.

With the measurement device according to the present configuration, since the scan trajectory of the measurement light is set to a circular shape on a plane including the measurement object, the measurement light can be prevented from irradiating objects other than the measurement object. Accordingly, a distance measurement result of an object other than the measurement object can be readily excluded and a state where a center of the scan trajectory of the measurement light tracks the measurement object can be more reliably maintained.

In the measurement device according to the present invention, preferably, the measurement object includes a first measurement object that extends in a linear shape in a first direction and a second measurement object that extends in a linear shape in a second direction orthogonal to the first direction, the first measurement object and the second measurement object are adjacently arranged in a quadrille pattern, and the control unit sets an approximately planer region including the first measurement object and the second measurement object, and detects coordinates included in the region as coordinates of an intersection point of the measurement object and the scan trajectory of the measurement light.

With the measurement device according to the present configuration, coordinates included in an approximately planer region including the first measurement object and the second measurement object with linear shapes arranged in a quadrille pattern are detected as coordinates of an intersection point but coordinates not included in the region are not detected as coordinates of an intersection point. Therefore, a structure other than the measurement object (for example, an uppermost rebar that is the measurement object and another rebar arranged below the uppermost rebar) is never detected as coordinates of an intersection point. Accordingly, only coordinates obtained from an intersection point with the measurement object can be reliably detected as the coordinates of the intersection point.

According to the present invention, the problem described above can be solved by a method for controlling a measurement device which performs a measurement of a measurement object, the measurement device including: a distance measuring unit having a light producing element which produces measurement light, a measurement light emitting unit which emits the measurement light, a light receiving unit which receives reflected measurement light, and a light receiving element which receives the reflected measurement light and generates a light reception signal; and a deflecting unit which deflects a direction of emission of the measurement light with respect to a reference optical axis and which is capable of performing a scan with the measurement light with respect to a prescribed center in a circumferential direction, the method including: a distance measurement step of performing a distance measurement of the measurement object on the basis of a light reception signal from the light receiving element; an intersection point detection step of detecting coordinates of intersection points of the measurement object that is formed in a linear shape and a scan trajectory of the measurement light on the basis of a distance measurement result in the distance measurement and the direction of emission that is deflected by the deflecting unit; and a control step of controlling a deflection operation of the deflecting unit so that intervals of the intersection points adjacent to each other are constant intervals on the measurement object.

With the method according to the present configuration, coordinates of intersection points of a measurement object that is formed in a linear shape and a scan trajectory of measurement light are detected in the control step on the basis of a distance measurement result by the distance measuring unit and a direction of emission that is deflected by the deflecting unit. In addition, the control step controls a deflection operation of the deflecting unit so that intervals of the intersection points adjacent to each other are constant intervals on the measurement object. Since intervals on the measurement object between intersection points of which coordinates are detected are constant intervals, coordinates of the measurement object can be obtained at a constant point density regardless of the distance from the measurement device to the measurement object. Therefore, coordinates of each position of the measurement object can be efficiently and accurately detected.

Advantageous Effects of Invention

According to the present invention, a measurement device capable of efficiently and accurately detecting coordinates of each position of a measurement object formed in a linear shape regardless of a distance from a measurement light emitting unit that emits measurement light to the measurement object and a method for controlling the measurement device can be provided.

DESCRIPTION OF EMBODIMENTS

Figure 1:
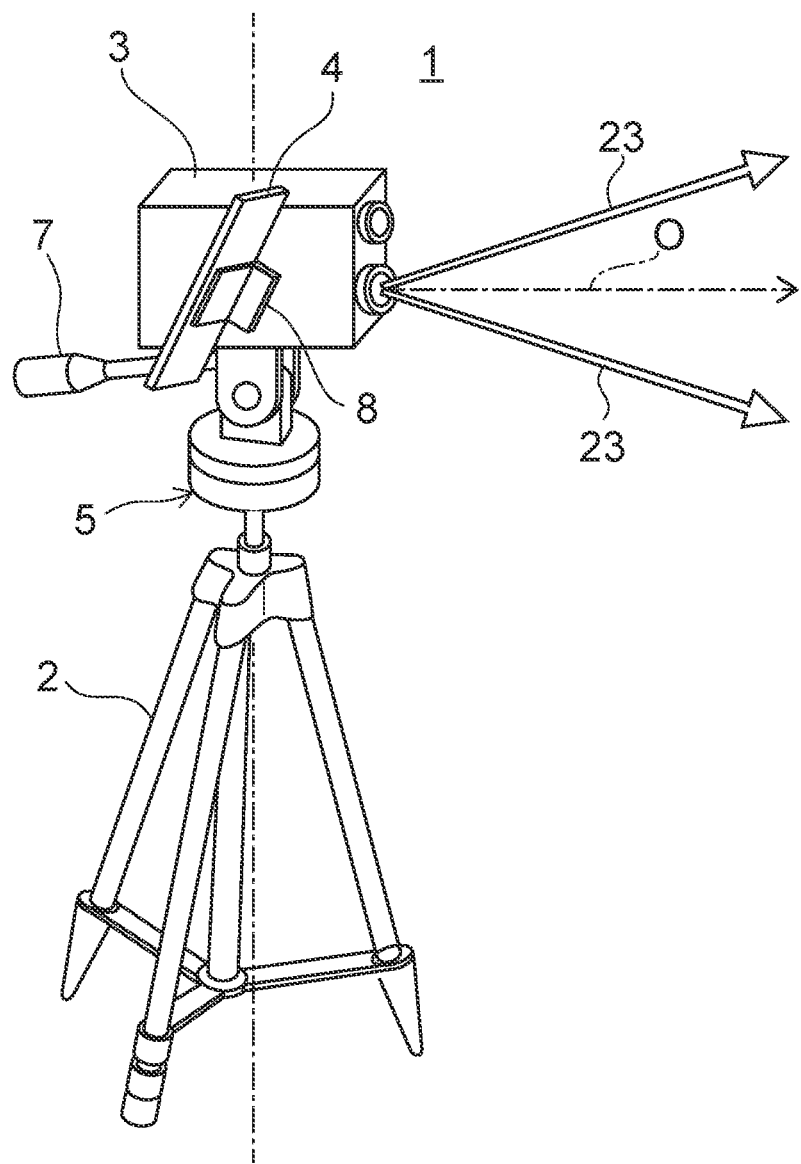
FIG. 1 is an external view of a survey system equipped with a laser scanner according to an embodiment of the present invention.

Hereinafter, an embodiment of the present invention will be described with reference to the drawings. First, an outline of a survey system (a measurement device) equipped with a laser scanner according to the present embodiment will be provided with reference to FIG. 1. In FIG. 1, reference numeral 1 denotes a survey system and reference character O denotes an optical axis in a state where the optical axis is not deflected by a deflecting unit 35 (to be described later), whereby the optical axis as this point will be used as a reference optical axis.

The survey system 1 is mainly constituted by a tripod 2 as a supporting apparatus, a laser scanner 3, an operating apparatus 4, and a turntable 5. The turntable 5 is mounted to a top end of the tripod 2, and the laser scanner 3 is mounted to the turntable 5 so as to be laterally rotatable and vertically rotatable. In addition, the turntable 5 is equipped with a function of detecting a rotational angle in a lateral direction (a rotational angle in a horizontal direction) of the laser scanner 3.

The turntable 5 is provided with a lever 7 that extends in the lateral direction. By operating the lever 7, the laser scanner 3 can be rotated in an up-down direction (a vertical direction) or in the lateral direction (a horizontal direction) and can also be fixed at a necessary attitude.

The laser scanner 3 has a built-in distance measuring unit 3A and a built-in attitude detecting unit 17, and the distance measuring unit 3A performs a measurement by emitting measurement light 23 to a measurement object or a measurement range and receiving reflected measurement light 24. In addition, the attitude detecting unit 17 is capable of detecting an attitude of the laser scanner 3 with respect to vertical (or horizontal) with high accuracy.

The operating apparatus 4 has a communication function for communicating with the laser scanner 3 via necessary means such as wired or wireless means. In addition, the operating apparatus 4 is attachable to and detachable from the laser scanner 3 via an attachment 8, the detached operating apparatus 4 can be held and operated by one hand, and the laser scanner 3 can be remotely operated using the operating apparatus 4.

Furthermore, images, a measurement state, a measurement result, and the like are to be transmitted from the laser scanner 3 to the operating apparatus 4 to be stored in the operating apparatus 4 and displayed on a display unit (not shown) of the operating apparatus 4. For example, the operating apparatus 4 may be a smart phone.

Figure 2:
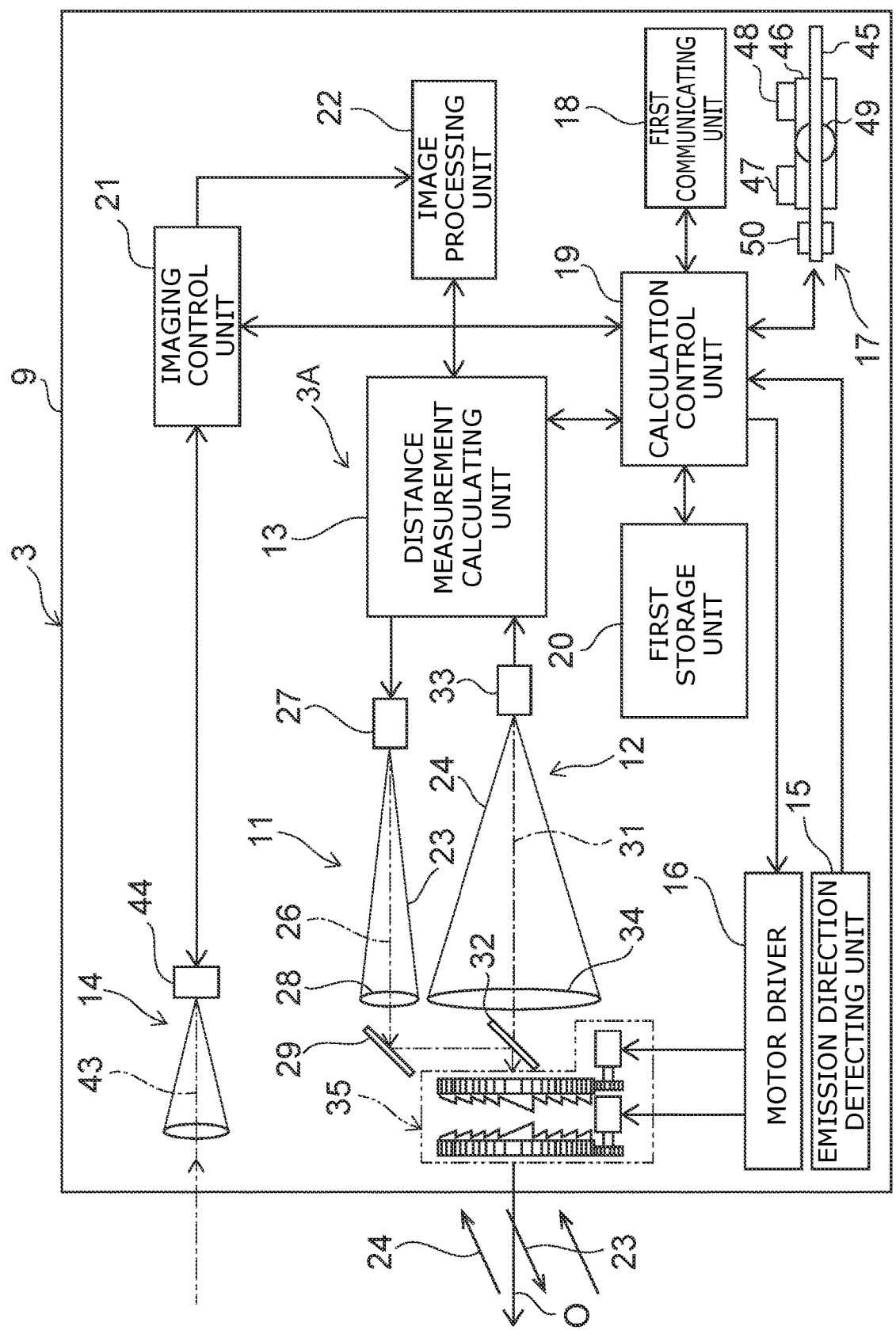
FIG. 2 is a schematic configuration diagram of the laser scanner shown in FIG. 1.

The laser scanner 3 will be described with reference to FIG. 2.

The laser scanner 3 is equipped with a measurement light emitting unit 11, a light receiving unit 12, a distance measurement calculating unit 13, an imaging unit 14, an emission direction detecting unit 15, a motor driver 16, the attitude detecting unit 17, a first communicating unit 18, a calculation control unit 19, a first storage unit 20, an imaging control unit 21, and an image processing unit 22, and the units are housed in an enclosure 9 and integrated with each other. It should be noted that the measurement light emitting unit 11, the light receiving unit 12, the distance measurement calculating unit 13, and the like constitute the distance measuring unit 3A.

The measurement light emitting unit 11 has an emission optical axis 26, and a light producing element 27 such as a laser diode (LD) is provided on the emission optical axis 26. In addition, a projection lens 28 is provided on the emission optical axis 26. Furthermore, a first reflecting mirror 29 as a deflecting optical member provided on the emission optical axis 26 and a second reflecting mirror 32 as a deflecting optical member provided on a reception optical axis 31 (to be described later) deflect the emission optical axis 26 so as to match the reception optical axis 31. The first reflecting mirror 29 and the second reflecting mirror 32 constitute an emission optical axis deflecting unit. The light producing element 27 produces a pulse laser beam, and the measurement light emitting unit 11 emits the pulse laser beam produced by the light producing element 27 as the measurement light 23.

The light receiving unit 12 will be described. Reflected measurement light 24 from a measurement object (in other words, a measurement point) is incident to the light receiving unit 12. The light receiving unit 12 has the reception optical axis 31 and, as described above, the emission optical axis 26 having been deflected by the first reflecting mirror 29 and the second reflecting mirror 32 matches the reception optical axis 31.

The deflecting unit 35 (to be described later) is arranged on the deflected emission optical axis 26 or, in other words, on the reception optical axis 31. A straight optical axis that passes through a center of the deflecting unit 35 constitutes the reference optical axis O. The reference optical axis O matches the emission optical axis 26 when not deflected by the deflecting unit 35 or the reception optical axis 31.

An imaging lens 34 and a light receiving element 33 such as a photodiode (PD) is arranged and provided on the incident reception optical axis 31 having passed through the deflecting unit 35. The imaging lens 34 focuses the reflected measurement light 24 on the light receiving element 33. The light receiving element 33 receives the reflected measurement light 24 and generates a light reception signal. The light reception signal is input to the distance measurement calculating unit 13. The distance measurement calculating unit 13 performs a distance measurement up to a measurement point on the basis of the light reception signal.

Figure 3:
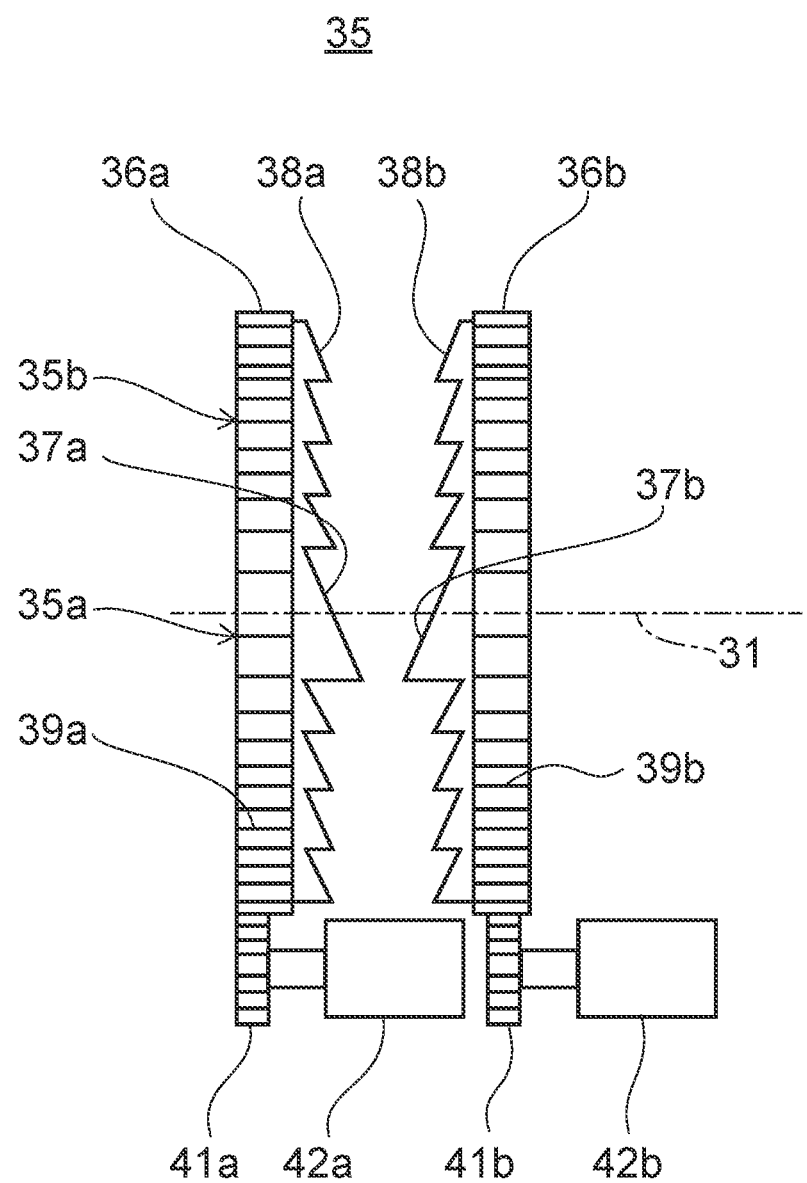
FIG. 3 is a schematic view of a deflecting unit in the laser scanner shown in FIG. 1.

The deflecting unit 35 will be described with reference to FIG. 3. The deflecting unit 35 is constituted by a pair of optical prisms 36a and 36b. The optical prisms 36a and 36b respectively have a disk shape and are orthogonally arranged on the reception optical axis 31 so as to overlap with, and in parallel to, each other. Using a Risley prism as each of the optical prisms 36a and 36b is preferable in terms of downsizing the apparatus. A center part of the deflecting unit 35 constitutes a measurement light deflecting unit 35a which is a first deflecting unit that transmits and emits the measurement light 23, and a portion excluding the center part constitutes a reflected measurement light deflecting unit 35b which is a second deflecting unit that transmits and emits the reflected measurement light 24.

The Risley prisms used as the optical prisms 36a and 36b are respectively constituted by prism elements 37a and 37b formed in parallel and a large number of prism elements 38a and 38b, and have a disk shape. The optical prisms 36a and 36b and the respective prism elements 37a, 37b and 38a, 38b have same optical characteristics.

The prism elements 37a and 37b constitute the measurement light deflecting unit 35a while the prism elements 38a and 38b constitute the reflected measurement light deflecting unit 35b. The Risley prisms may be manufactured of optical glass or molded from an optical plastic material. Molding the Risley prisms from an optical plastic material enables the Risley prisms to be inexpensively manufactured.

The optical prisms 36a and 36b are each arranged so as to be independently and individually rotatable around the reception optical axis 31. By independently controlling a rotational direction, a rotational amount, and a rotational speed of the optical prisms 36a and 36b, the measurement light 23 passing through the emission optical axis 26 is deflected in an arbitrary direction and the received reflected measurement light 24 is deflected so as to be parallel to the reception optical axis 31. An external shape of each of the optical prisms 36a and 36b is a circular shape centered on the reception optical axis 31, and diameters of the optical prisms 36a and 36b are set so as to enable a sufficient amount of light to be acquired in consideration of the spread of the reflected measurement light 24.

A ring gear 39a is fitted to an outer circumference of the optical prism 36a, and a ring gear 39b is fitted to an outer circumference of the optical prism 36b. A drive gear 41a meshes with the ring gear 39a, and the drive gear 41a is fastened to an output shaft of a motor 42a. In a similar manner, a drive gear 41b meshes with the ring gear 39b, and the drive gear 41b is fastened to an output shaft of a motor 42b. The motors 42a and 42b are electrically connected to the motor driver 16.

As the motors 42a and 42b, a motor capable of detecting an angle of rotation or a motor that produces rotation corresponding to a drive input value such as a pulse motor is used. Alternatively, a rotational amount of the motor may be detected using a rotational angle detector that detects a rotational amount (a rotational angle) of the motor such as an encoder. Rotational amounts of the motors 42a and 42b are respectively detected and the motors 42a and 42b are individually controlled by the motor driver 16. Alternatively, a configuration may be adopted in which encoders are respectively directly mounted to the ring gears 39a and 39b and the rotational angles of the ring gears 39a and 39b are directly detected by the encoders.

The drive gears 41a and 41b and the motors 42a and 42b are provided at positions where interference with the measurement light emitting unit 11 is prevented such as below the ring gears 39a and 39b.

The projection lens 28, the first reflecting mirror 29, the second reflecting mirror 32, the measurement light deflecting unit 35a, and the like constitute a projection optical system, and the reflected measurement light deflecting unit 35b, the imaging lens 34, and the like constitute a reception optical system.

The distance measurement calculating unit 13 controls the light producing element 27 and causes the light producing element 27 to produce a pulse laser beam as the measurement light 23. The measurement light 23 is deflected by the prism elements 37a and 37b (the measurement light deflecting unit 35a) so as to be directed toward a measurement point.

The reflected measurement light 24 reflected from the measurement object is incident to and received by the light receiving element 33 via the prism elements 38a and 38b (the reflected measurement light deflecting unit 35b) and the imaging lens 34. The light receiving element 33 sends a light reception signal to the distance measurement calculating unit 13, and on the basis of the light reception signal from the light receiving element 33, the distance measurement calculating unit 13 performs a distance measurement of a measurement point (a point irradiated by the measurement light 23) for each pulse beam and stores distance measurement data in the first storage unit 20. In this manner, distance measurement data of each measurement point can be acquired by performing a distance measurement for each pulse beam while performing a scan with the measurement light 23.

The emission direction detecting unit 15 detects rotational angles of the motors 42a and 42b by counting drive pulses input to the motors 42a and 42b. Alternatively, the emission direction detecting unit 15 detects the rotational angles of the motors 42a and 42b on the basis of signals from encoders. In addition, the emission direction detecting unit 15 calculates rotational positions of the optical prisms 36a and 36b on the basis of the rotational angles of the motors 42a and 42b.

Furthermore, the emission direction detecting unit 15 calculates a direction of emission of the measurement light 23 on the basis of refractive indexes and rotational positions of the optical prisms 36a and 36b and inputs a calculation result to the calculation control unit 19. The calculation control unit 19 can obtain three-dimensional data of each measurement point by calculating a horizontal angle $\theta 1$ and a vertical angle $\theta 2$ of the measurement point relative to the reference optical axis O from the direction of emission of the measurement light 23 and associating the horizontal angle θ1 and the vertical angle θ2 with the distance measurement data for the measurement point.

The attitude detecting unit 17 will be described. The attitude detecting unit 17 has a frame 45, and the frame 45 is fixed to the enclosure 9 or to a structural member and integrated with the laser scanner 3. A sensor block 46 is mounted to the frame 45 via gimbals. The sensor block 46 is configured so as to be rotatable by 360 degrees around two orthogonal axes. A first inclination sensor 47 and a second inclination sensor 48 are mounted to the sensor block 46.

The first inclination sensor 47 detects horizontal at high accuracy and is constituted by, for example, an inclination detector that detects horizontal on the basis of a variation in a reflection angle of reflected light of detection light incident to a horizontal liquid surface or a bubble tube that detects an inclination on the basis of a positional variation of a bubble encapsulated therein. In addition, the second inclination sensor 48 detects an inclination variation with high responsiveness and is, for example, an acceleration sensor.

Relative rotational angles around the two axes of the sensor block 46 with respect to the frame 45 are detected by encoders 49 and 50. In addition, a motor (not shown) that rotates the sensor block 46 to keep the sensor block 46 horizontal is provided with respect to the two axes, and the motor is controlled by the calculation control unit 19 on the basis of detection results from the first inclination sensor 47 and the second inclination sensor 48 so as to keep the sensor block 46 horizontal.

When the sensor block 46 is inclined (when the laser scanner 3 is inclined), a relative rotational angle with respect to the sensor block 46 is detected by the encoders 49 and 50 and, on the basis of the detection results of the encoders 49 and 50, an inclination angle and an inclination direction of the laser scanner 3 are detected. Since the sensor block 46 is rotatable by 360 degrees around the two axes, regardless of what kind of attitude is assumed by the attitude detecting unit 17 (for example, even when top and bottom of the attitude detecting unit 17 are reversed), attitude detection can be performed in all directions.

Although attitude detection and attitude control are performed on the basis of a detection result of the second inclination sensor 48 when high responsiveness is required in the attitude detection, generally, detection accuracy of the second inclination sensor 48 is lower than that of the first inclination sensor 47. With the attitude detecting unit 17 equipped with the high-accuracy first inclination sensor 47 and the highly-responsive second inclination sensor 48, attitude control is performed on the basis of a detection result of the second inclination sensor 48 while the first inclination sensor 47 enables attitude detection with high accuracy.

A detection result of the second inclination sensor 48 can be calibrated by a detection result of the first inclination sensor 47. Specifically, when a deviation occurs between values of the encoders 49 and 50 when the first inclination sensor 47 detects horizontal or, in other words, between an actual inclination angle and an inclination angle detected by the second inclination sensor 48, the inclination angle of the second inclination sensor 48 can be calibrated on the basis of the deviation.

Therefore, by acquiring, in advance, a relationship between a detected inclination angle of the second inclination sensor 48 and an inclination angle obtained on the basis of horizontal detection by the first inclination sensor 47 and detection results of the encoders 49 and 50, the inclination angle detected by the second inclination sensor 48 can be calibrated and accuracy of attitude detection with high responsiveness by the second inclination sensor 48 can be improved.

When a variation in inclination is large or rapid, the calculation control unit 19 controls the motor on the basis of a signal from the second inclination sensor 48. On the other hand, when a variation in inclination is small or gradual or, in other words, when the variation in inclination can be tracked by the first inclination sensor 47, the calculation control unit 19 controls the motor on the basis of a signal from the first inclination sensor 47.

The first storage unit 20 stores contrast data indicating a result of a comparison between a detection result of the first inclination sensor 47 and a detection result of the second inclination sensor 48. The detection result by the second inclination sensor 48 is calibrated on the basis of a signal from the second inclination sensor 48. Due to the calibration, a detection accuracy of the detection result of the second inclination sensor 48 can be raised to a detection accuracy of the first inclination sensor 47. Therefore, in attitude detection by the attitude detecting unit 17, high responsiveness can be realized while maintaining high accuracy.

The imaging unit 14 is a camera having an imaging optical axis 43 which is parallel to the reference optical axis O of the laser scanner 3 and an angle of view of, for example, 50 degrees, and acquires image data including a scan range of the laser scanner 3. A relationship among the imaging optical axis 43, the emission optical axis 26, and the reference optical axis O is known. In addition, the imaging unit 14 is capable of acquiring moving images or continuous images.

The imaging control unit 21 controls imaging by the imaging unit 14. When the imaging unit 14 captures a moving image or a continuous image, the imaging control unit 21 synchronizes a timing of acquiring a frame image that constitutes the moving image or the continuous image and a timing of scanning with the laser scanner 3. The calculation control unit 19 also associates an image with point group data.

An imaging element 44 of the imaging unit 14 is a CCD or a CMOS sensor which is an aggregate of pixels, and a position of each pixel on an image element can be specified. For example, each pixel has pixel coordinates in a coordinate system of which an origin is the imaging optical axis 43, and the position of the pixel on an image element is specified by the pixel coordinates. The image processing unit 22 performs image processing for superimposing information to be displayed by the operating apparatus 4 on image data acquired by the imaging unit 14 and the like. An image generated by the image processing unit 22 is displayed on an operation screen 4A of the operating apparatus 4 by the calculation control unit 19.

A measurement operation by the laser scanner 3 will now be described. The tripod 2 is installed at a known point or a prescribed point and the reference optical axis O is directed toward a measurement object. A horizontal angle of the reference optical axis O at this point is detected by the horizontal angle detection function of the turntable 5 and an inclination angle of the reference optical axis O relative to horizontal is detected by the attitude detecting unit 17.

Figure 4:
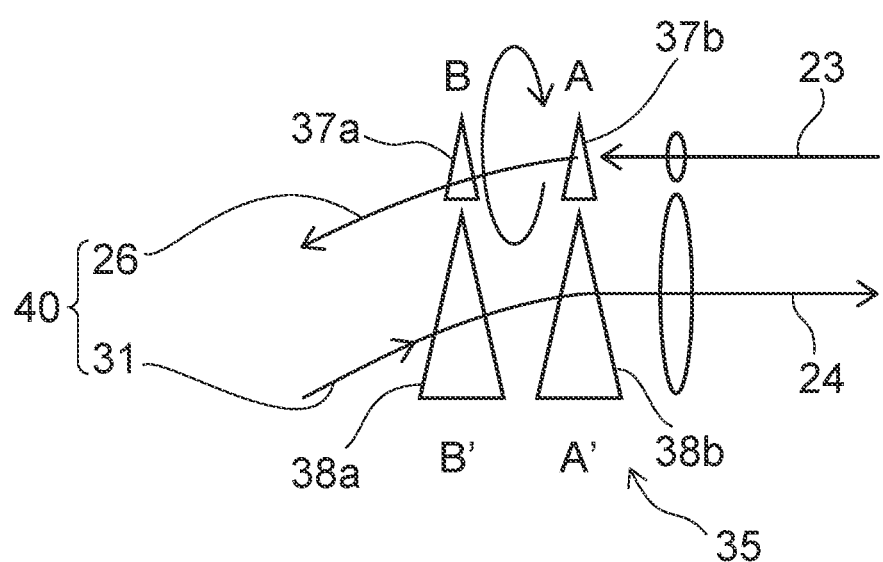
FIG. 4 is a diagram illustrating an action of the deflecting unit shown in FIG. 3.

A deflection operation and a scan operation of the deflecting unit 35 will be described with reference to FIG. 4. In FIG. 4, for the sake of brevity, the prism elements 37a and 37b and the prism elements 38a and 38b are shown separated from each other in the optical prisms 36a and 36b. In addition, FIG. 4 shows a state where the prism elements 37*a* and 37*b* and the prism elements 38*a* and 38*b* are positioned in a same direction, and a maximum deflection angle is obtained in this state. On the other hand, a minimum deflection angle is obtained at a position where one of the optical prisms 36*a* and 36*b* has rotated by 180 degrees, in which case mutual optical actions of the optical prisms 36*a* and 36*b* cancel each other out to produce a deflection angle of 0 degrees. Therefore, the measurement light 23 emitted via the optical prisms 36*a* and 36*b* and the reflected measurement light 24 received via the optical prisms 36*a* and 36*b* match the reference optical axis O.

The measurement light 23 is produced by the light producing element 27, made into a parallel luminous flux by the projection lens 28, passes through the measurement light deflecting unit 35*a* (the prism elements 37*a* and 37*b*), and emitted toward the measurement object or a measurement range. By passing through the measurement light deflecting unit 35*a*, the measurement light 23 is deflected and emitted in a necessary direction by the prism elements 37*a* and 37*b*. The reflected measurement light 24 reflected by the measurement object or the measurement range passes through and is incident to the reflected measurement light deflecting unit 35*b* and is focused on the light receiving element 33 by the imaging lens 34.

By passing through the reflected measurement light deflecting unit 35*b*, the reflected measurement light 24 is deflected by the prism elements 38*a* and 38*b* so as to match the reception optical axis 31 (FIG. 4). Due to a combination of rotational positions of the optical prism 36*a* and the optical prism 36*b*, a deflection direction and a deflection angle of the measurement light 23 to be emitted can be arbitrarily changed.

Therefore, by controlling the deflecting unit 35 while producing a laser beam with the light producing element 27, the calculation control unit 19 can perform a scan with the measurement light 23 in a circular trajectory. It is needless to say that the reflected measurement light deflecting unit 35*b* integrally rotates with the measurement light deflecting unit 35*a*.

Furthermore, by executing distance measurement while performing scans with the measurement light 23 by continuously varying the deflection angle of the deflecting unit 35, distance measurement data (scan data) can be acquired along a scan trajectory. In addition, with respect to scan conditions determined by a scan speed, a scan density, and the like, the scan speed is increased or reduced by increasing or reducing a rotational speed of the motors 42*a* and 42*b* while maintaining a relationship therebetween, and the scan density can be set to a prescribed value by controlling a relationship between the scan speed and a pulse emission period of the measurement light 23.

An emission direction angle of the measurement light 23 during measurement can be detected from rotational angles of the motors 42*a* and 42*b*, and three-dimensional distance measurement data can be acquired by associating the emission direction angle during measurement with distance measurement data. Therefore, the laser scanner 3 can be made to function as a laser scanner that acquires point group data having three-dimensional position data.

Next, processing of acquiring point group data of a measurement object by the survey system 1 according to the present embodiment will be described. The measurement objects according to the present embodiment are rebars 100 which are iron rod members formed so as to extend in a linear shape.

Figure 5:
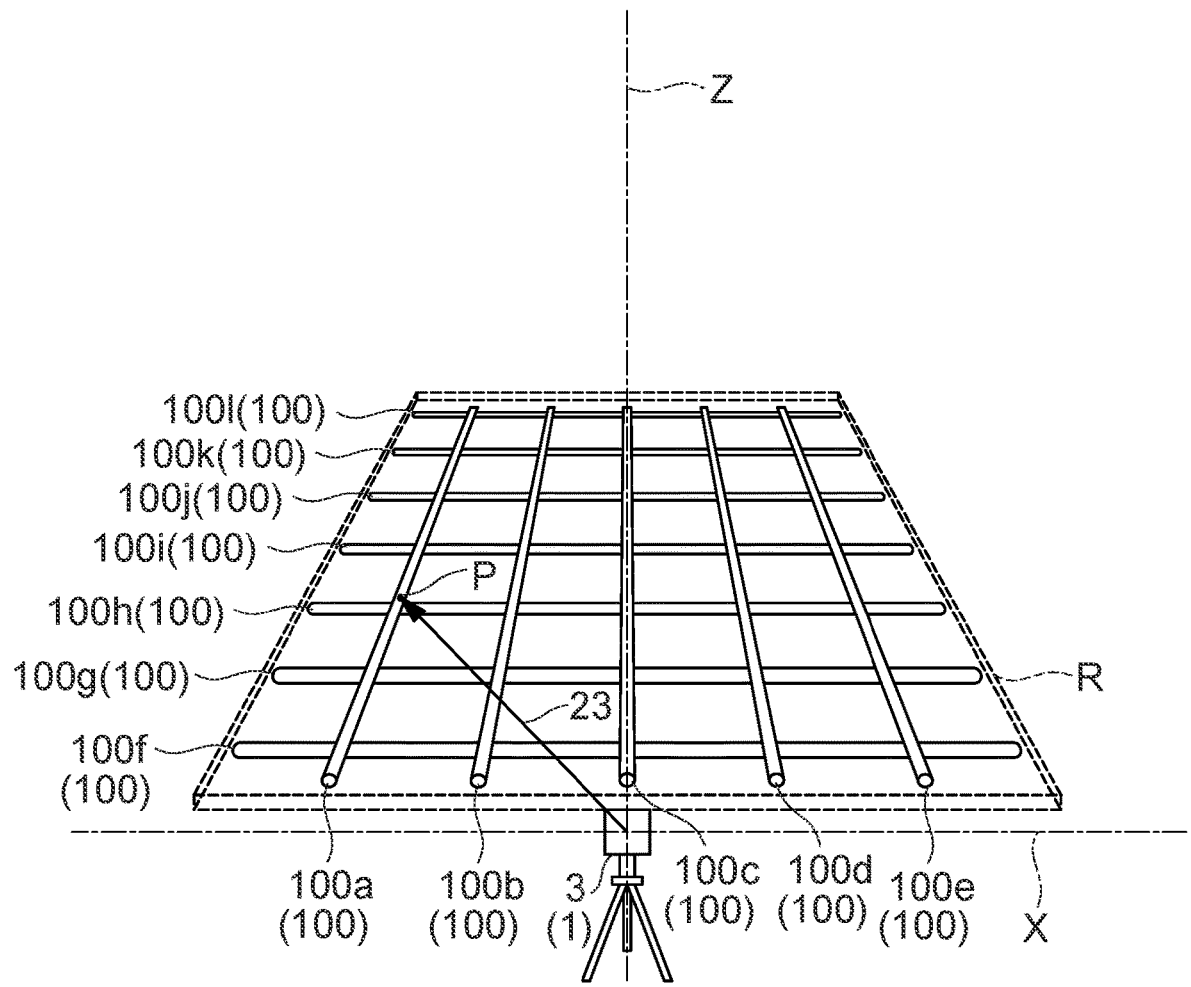
FIG. 5 is an X-Z plan view in which rebars are viewed along a reference optical axis.
Figure 6:
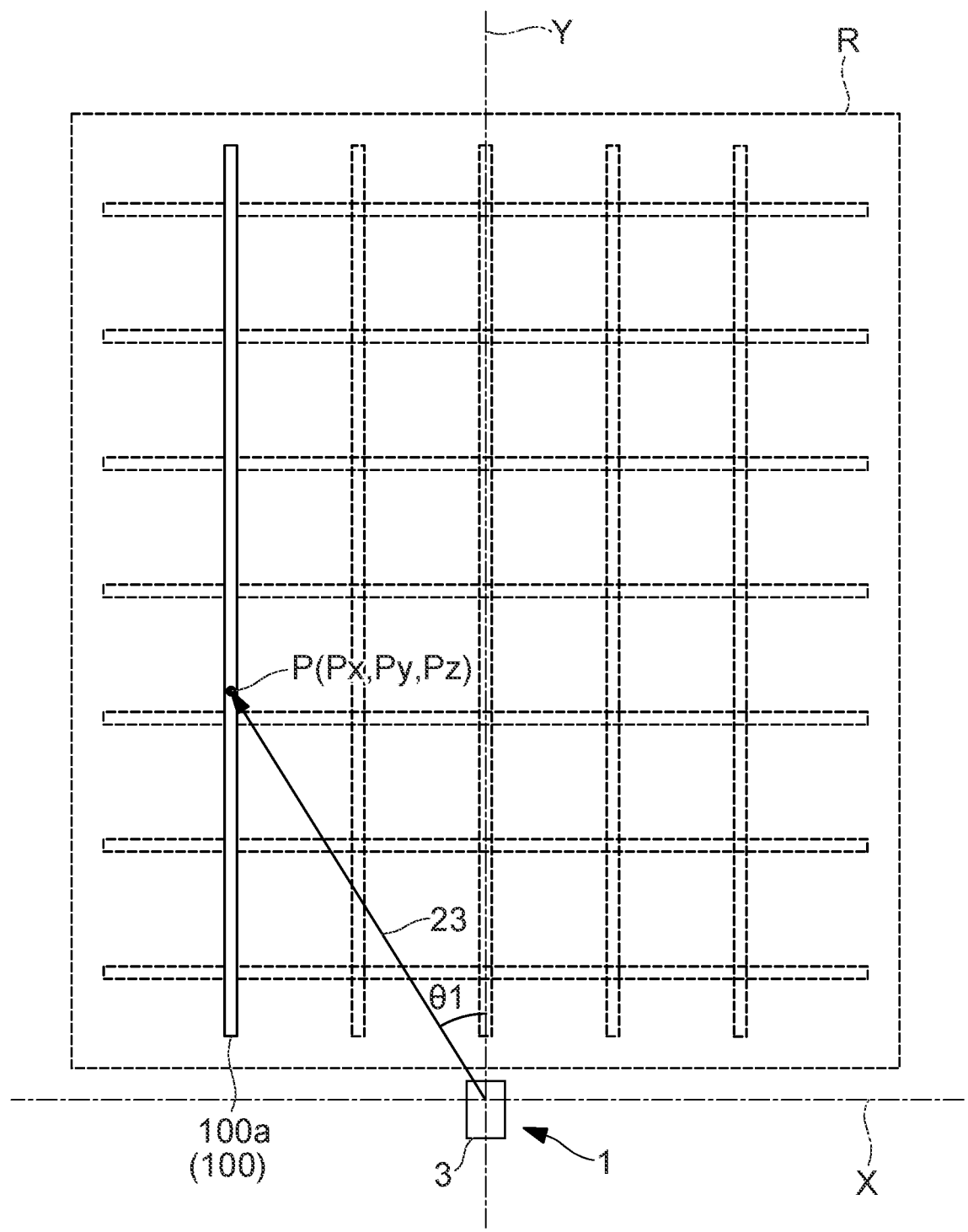
FIG. 6 is an X-Y plan view in which the rebars and the survey system are viewed from above.
Figure 7:
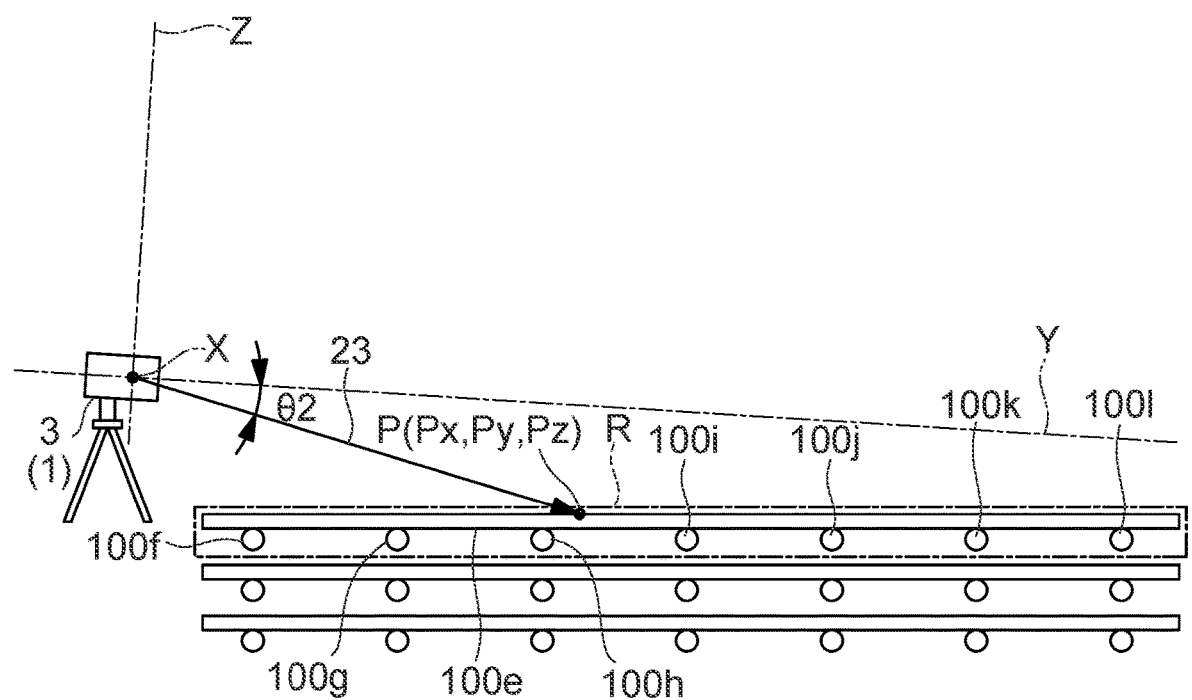
FIG. 7 is a Y-Z plan view in which the rebars and the survey system are viewed from the side.

FIG. 5 is an X-Z plan view in which the rebars 100 are viewed along the reference optical axis O. FIG. 6 is an X-Y plan view in which the rebars 100 and the survey system 1 are viewed from above. FIG. 7 is a Y-Z plan view in which the rebars 100 and the survey system 1 are viewed from the side. The rebars 100 include rebars 100*a*, 100*b*, 100*c*, 100*d*, and 100*e* (first measurement objects) which extend in a linear shape in a first direction (a depth direction in FIG. 5) and rebars 100*f*, 100*g*, 100*h*, 100*i*, 100*j*, 100*k*, and 100*l* (second measurement objects) which extend in a linear shape in a second direction (a width direction in FIG. 5).

As shown in FIG. 5, the plurality of rebars 100 (100*a*, 100*b*, 100*c*, 100*d*, and 100*e*) which extend in the first direction are arranged parallel to each other at intervals in the second direction that is orthogonal to the first direction. The plurality of rebars 100 (100*f*, 100*g*, 100*h*, 100*i*, 100*j*, 100*k*, and 100*l*) which extend in the second direction are arranged parallel to each other at intervals in the first direction. The plurality of rebars 100 which extend in the first direction and the plurality of rebars 100 which extend in the second direction are adjacently arranged in a quadrille pattern.

In FIGS. 5 to 7, an axis X, an axis Y, and an axis Z are axes that pass a reference point of measurement of the laser scanner 3 of the survey system 1. The axis Y is an axis that matches the reference optical axis O of the laser scanner 3. The axis X and Z are axes that are orthogonal to each other at the reference point and respectively orthogonal to the axis Y. A position P (Px, Py, Pz) in a three-dimensional space defined by the axis X, the axis Y, and the axis Z represents coordinates with the laser scanner 3 as a reference.

As described earlier, a horizontal angle (an inclination angle relative to a horizontal plane) of the axis Y can be detected by the attitude detecting unit 17. Therefore, by correcting the position P (Px, Py, Pz) on the basis of the horizontal angle detected by the attitude detecting unit 17, the calculation control unit 19 can calculate a position with the horizontal plane as a reference. Alternatively, the survey system 1 according to the present embodiment may not include the attitude detecting unit 17. Even if the survey system 1 does not include the attitude detecting unit 17 and calculates a position with the horizontal plane as a reference, coordinates of the rebars 100 in a three-dimensional space defined by the axis X, the axis Y, and the axis Z can be detected and an arrangement state (directions, intervals, and the like) of the rebars 100 can be detected.

In FIGS. 5 to 7, the measurement light 23 is deflected by the deflecting unit 35 so as to pass the position P (Px, Py, Pz) on the rebar 100*a*. Px denotes a coordinate of the position P on the axis X, Py denotes a coordinate of the position P on the axis Y, and Pz denotes a coordinate of the position P on the axis Z.

As shown in FIG. 6, on an X-Y plane (a plane on which the axis X and the axis Y are arranged), an angle formed by the axis Y and the direction of emission of the measurement light 23 is a horizontal angle $\theta 1$. As shown in FIG. 7, on a Y-Z plane (a plane on which the axis Y and the axis Z are arranged), an angle formed by the axis Y and the measurement light 23 is a vertical angle $\theta 2$. The emission direction detecting unit 15 calculates the horizontal angle $\theta 1$ and the vertical angle $\theta 2$ which indicate the direction of emission of the measurement light 23 on the basis of refractive indexes and rotational positions of the optical prisms 36*a* and 36*b*.

Figure 8:
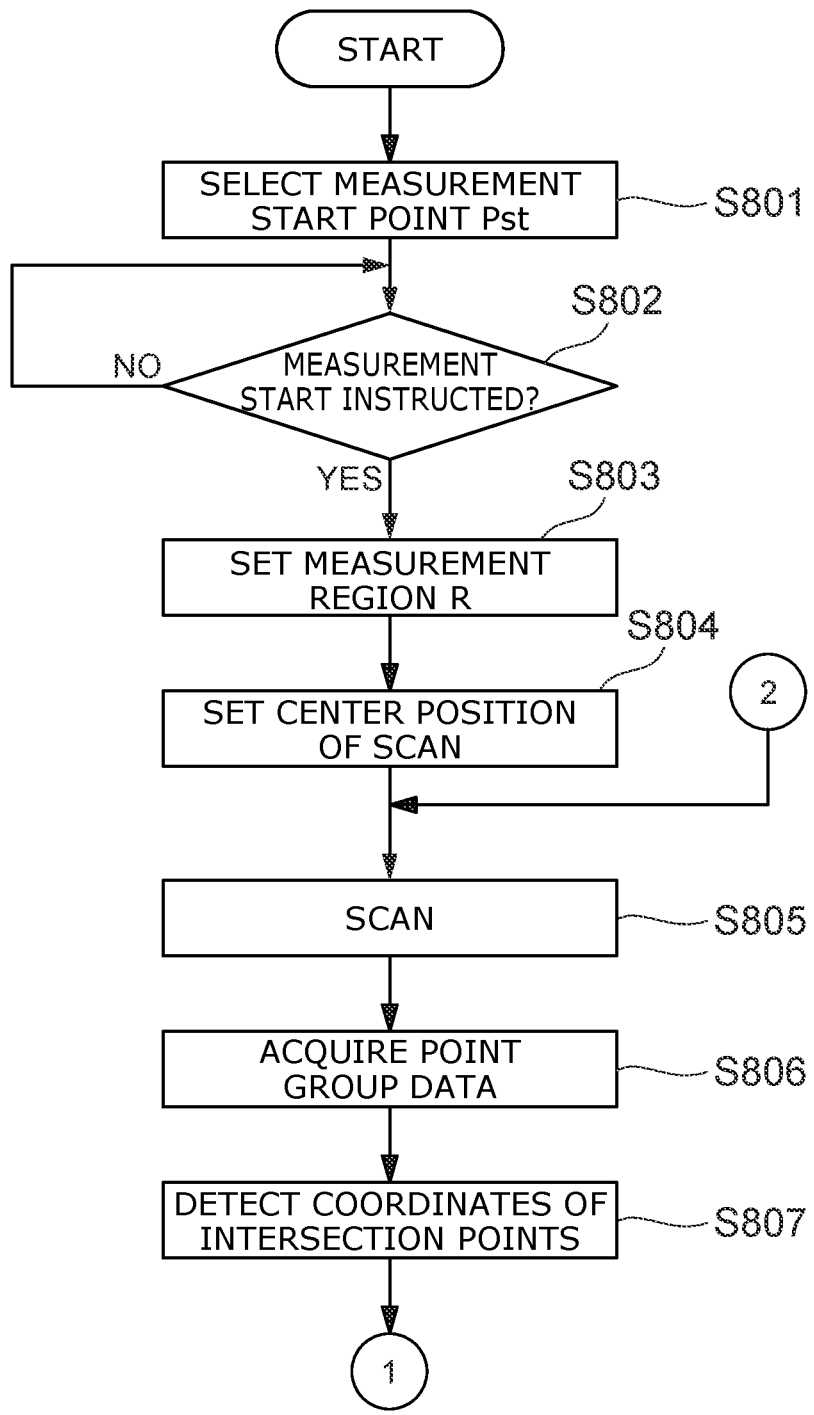
FIG. 8 is a flow chart showing processing executed by a calculation control unit.
Figure 9:
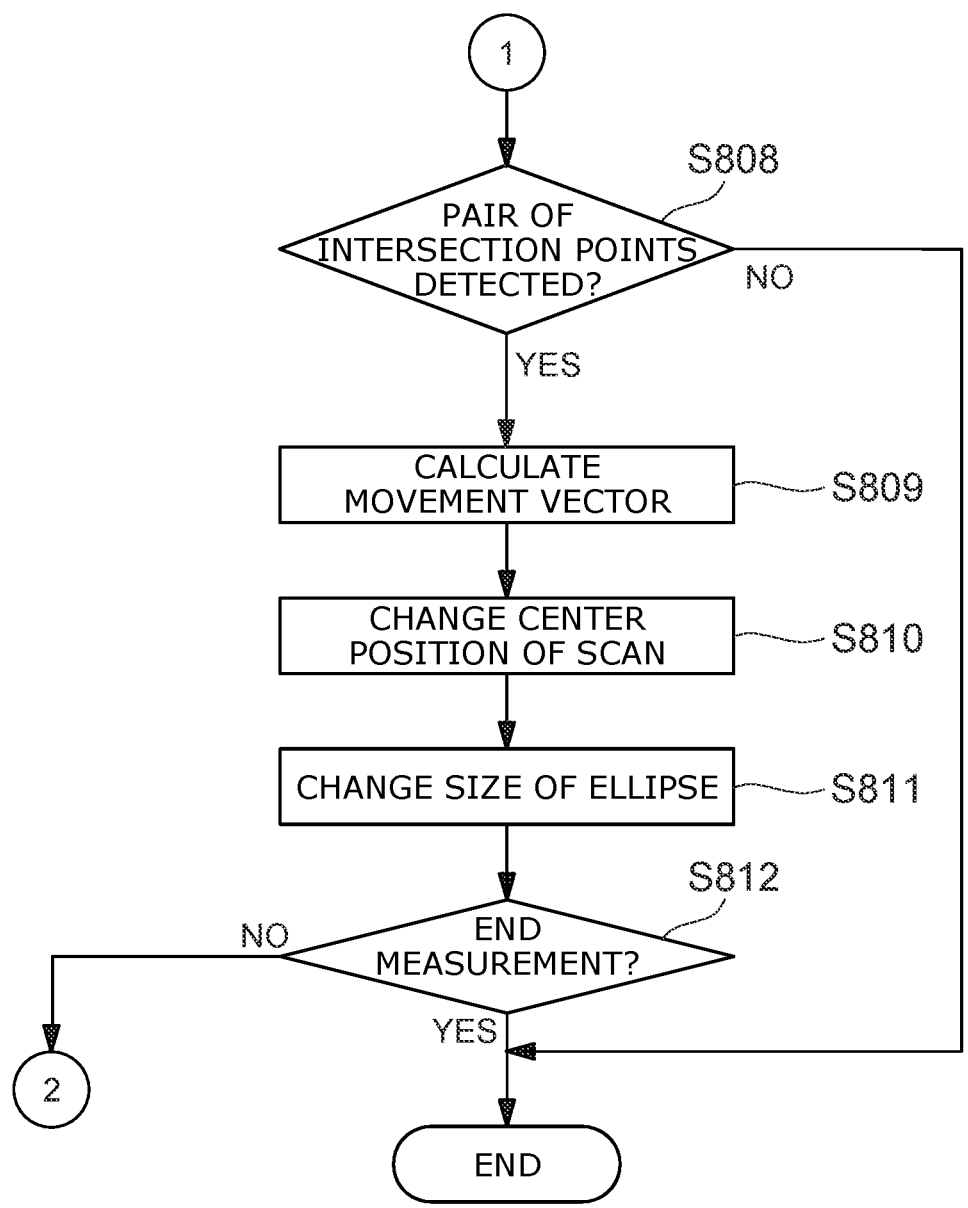
FIG. 9 is a flow chart showing processing executed by the calculation control unit.

Next, processing executed by the calculation control unit 19 will be described with reference to FIGS. 8 and 9. FIGS. 8 and 9 are flow charts showing the processing executed by the calculation control unit 19. For example, the calculation control unit 19 is constituted by a CPU (Central Processing Unit), a RAM (Random Access Memory), a ROM (Read Only Memory), a computer-readable storage medium, and the like. In addition, for example, a series of processing for realizing various functions are stored in a program format in the storage medium or the like, in which case the various functions are realized by having the CPU read the program to the RAM or the like and execute information processing and information calculation processing.

Figure 10:
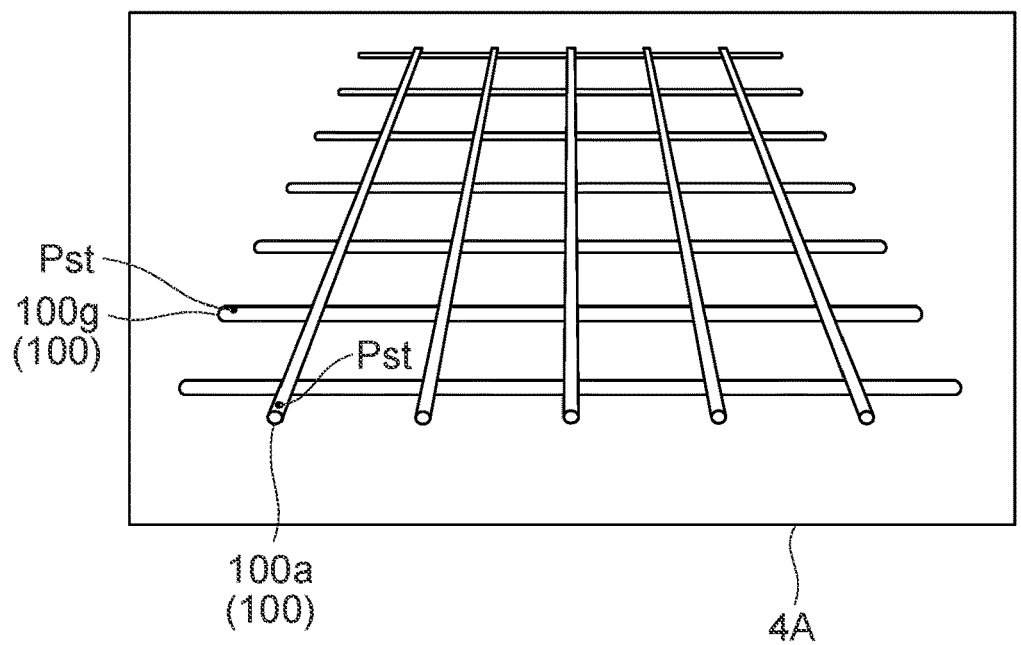
FIG. 10 is a diagram showing an example of an image displayed on an operation screen of an operating apparatus.

In step S801, the calculation control unit 19 selects a measurement start point Pst to be a start point where a measurement of the rebars 100 is started on the basis of an instruction from an operator. The calculation control unit 19 causes an image captured by the imaging unit 14 such as that shown in FIG. 10 to be displayed on the operation screen 4A of the operating apparatus 4 and prompts the operator to input the measurement start point Pst. The reference characters shown in FIG. 10 are added for explanatory purposes and are not displayed on the operation screen 4A.

For example, the calculation control unit 19 displays a message reading "Touch measurement start point Pst" on the operation screen 4A. For example, a touch sensor is built into the operation screen 4A. The calculation control unit 19 recognizes a position on the operation screen 4A touched by a finger of the operator as the measurement start point Pst. When the measurement start point Pst on the rebar 100a shown in FIG. 10 is designated, the rebar 100a becomes the measurement object. When the measurement start point Pst on the rebar 100g shown in FIG. 10 is designated, the rebar 100g becomes the measurement object.

In step S802, the calculation control unit 19 determines whether or not an instruction to start a measurement of the rebars 100 has been issued by the operator, and when it is determined that an instruction to start a measurement has been issued, the calculation control unit 19 advances processing to step S804. For example, the calculation control unit 19 causes a message reading "Start measurement?" and "YES" and "NO" buttons to be displayed on the operation screen 4A, and when the operator presses the "YES" button, the calculation control unit 19 determines that an instruction to start a measurement has been issued.

In step S803, the calculation control unit 19 sets a measurement region R. The measurement region R is a region set in order to narrow down coordinates to be detected as coordinates of intersection points between the rebars 100 and a scan trajectory of the measurement light 23. The measurement region R is an approximately planer region including the rebars 100a, 100b, 100c, 100d, and 100e (first measurement objects) and the rebars 100f, 100g, 100h, 100i, 100j, 100k, and 100l (second measurement objects). For example, the measurement region R is set by designating four points on the image being displayed on the operation screen 4A.

Alternatively, a position where two orthogonal rebars (for example, the rebar 100a and the rebar 100g) intersect each other in a three-dimensional space may be detected by scanning peripheral directions of the four points of the measurement region R set using the operation screen 4A, whereby the measurement region R may be set so as to include coordinates of the intersection point.

In step S804, the calculation control unit 19 sets a center position of a scan on the basis of the measurement start point Pst selected in step S801. The calculation control unit 19 calculates a horizontal angle $\theta 1$ and a vertical angle $\theta 2$ of a measurement point relative to the reference optical axis O so as to perform a scan around the measurement start point Pst. In this case, a scan refers to an operation of scanning a prescribed center in a circumferential direction by one rotation with the measurement light 23. The calculation control unit 19 calculates the horizontal angle 81 and the vertical angle $\theta 2$ so as to perform a scan around the measurement start point Pst on the rebar 100a from two-dimensional coordinates of the measurement start point Pst on the operation screen 4A.

In step S805, the calculation control unit 19 performs a scan on the basis of the horizontal angle $\theta 1$ and the vertical angle $\theta 2$ calculated in step S804 or step S812. By rotating the optical prism 36a and the optical prism 36b so as to assume rotational positions in accordance with the horizontal angle $\theta 1$ and the vertical angle $\theta 2$, the calculation control unit 19 scans a prescribed center by one rotation in the circumferential direction with the measurement light 23. The distance measurement calculating unit 13 performs a distance measurement of the measurement point for each of a plurality of pulses included in the measurement light 23 on the basis of a light reception signal from the light receiving element 33 with respect to the measurement light 23. The calculation control unit 19 stores distance measurement data obtained by distance measurement by the distance measurement calculating unit 13 in the first storage unit 20.

Figure 11:
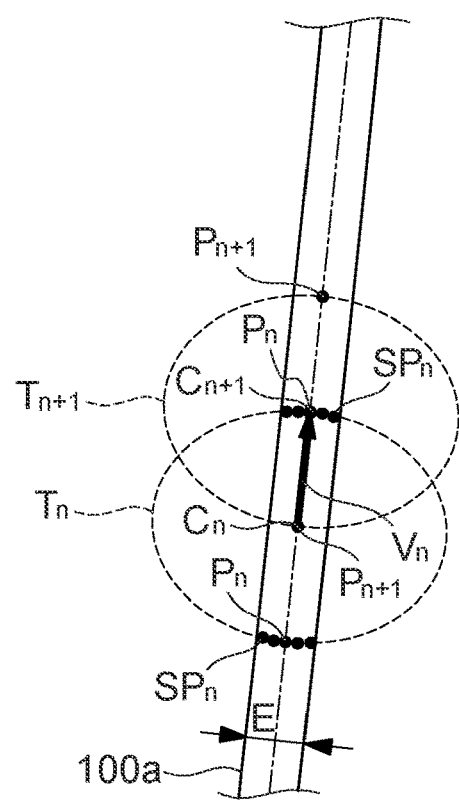
FIG. 11 is a diagram showing a state where rebars are scanned.

FIG. 11 is a diagram showing a state where the rebar 100a is scanned. FIG. 11 is a diagram in which the rebar 100a is viewed along the reference optical axis O in a similar manner to FIG. 5. In FIG. 11, a reference character Cn denotes a center position of a scan. A reference character Tn denotes a scan trajectory of a scan performed around the center position Cn with the measurement light 23. A reference character SPn denotes a plurality of measurement points by the pulsed measurement light 23.

By controlling rotations of the optical prism 36a and the optical prism 36b of the deflecting unit 35, the calculation control unit 19 is capable of adjusting a size of an ellipse (a length of a major axis and a length of a minor axis of the ellipse) indicating a scan trajectory of the measurement light 23 shown in FIG. 11. When executing step S805 after step S804, the calculation control unit 19 adjusts the ellipse to a size determined in advance. On the other hand, when executing step S805 after step S811 to be described later, a scan is to be performed in a size to which the ellipse is changed in step S811.

As shown in FIG. 11, when the rebars 100 are scanned, the scan trajectory Tn of the measurement light 23 and the rebars 100 intersect each other at two locations. At each of the two locations, the measurement light 23 from the rebars 100 is reflected at the plurality of measurement points SPn and received by the light receiving element 33. In this case, n denotes an arbitrary integer equal to or greater than 0, and it is assumed that n=0 at the measurement start point Pst and that n is added every time the horizontal angle $\theta 1$ and the vertical angle $\theta 2$ are changed from the measurement start point Pst. The example shown in FIG. 11 represents a state where a scan is performed after changing the horizontal angle $\theta 1$ and the vertical angle $\theta 2$ n-number of times from the measurement start point Pst.

In step S806, on the basis of the horizontal angle $\theta 1$ and the vertical angle $\theta 2$ of the measurement light 23 calculated in step S804 or S811 and distance measurement data of the plurality of measurement points SPn stored in the first storage unit 20, the calculation control unit 19 acquires point group data that is an aggregate of three-dimensional coordinates of the plurality of measurement points SPn. Specifically, the calculation control unit 19 acquires point group data by associating the horizontal angle $\theta 1$ and the vertical angle $\theta 2$ of the measurement light 23 with the distance measurement data of each measurement point SPn. The calculation control unit 19 stores the acquired point group data in the first storage unit 20.

In step S807, the calculation control unit 19 detects coordinates of intersection points Pn which indicate positions where the scan trajectory Tn of the measurement light 23 and the rebars 100 intersect each other from the point group data stored in the first storage unit 20 in step S806. The intersection points Pn are arranged below and above the center position Cn in FIG. 11. For example, the calculation control unit 19 obtains coordinates of the intersection point Pn below the center position Cn by calculating an average value of coordinates of point group data of a plurality of points below the center position Cn. In addition, for example, the calculation control unit 19 obtains coordinates of the intersection point Pn above the center position Cn by calculating an average value of coordinates of point group data of a plurality of points above the center position Cn.

In this case, point group data refers to data calculated on the basis of the horizontal angle θ1 and the vertical angle θ2 of the measurement light 23 and distance measurement data (a measurement result) of the plurality of measurement points SPn stored in the first storage unit 20. Therefore, the calculation control unit 19 detects coordinates of the pair of intersection points Pn on the basis of a distance measurement result of the distance measuring unit 3A and the horizontal angle θ1 and the vertical angle θ2 detected by the emission direction detecting unit 15.

While the coordinates of the intersection points Pn are obtained by calculating an average value of coordinates of a plurality of pieces of point group data, other modes may be adopted instead. For example, light reception intensity by the light receiving element 33 of the reflected measurement light 24 which corresponds to each piece of point group data may be stored together with coordinates of a plurality of pieces of point group data, and a piece of point group data with highest light reception intensity among the plurality of pieces of point group data may be adopted as the coordinates of the intersection points Pn.

In addition, when detecting coordinates of intersection points in step S807, the calculation control unit 19 excludes point group data that is not included in the measurement region R set in step S803. In other words, as shown in FIG. 7, the coordinates of intersection points in the measurement region R are extracted such that point groups of the rebars 100 arranged in an uppermost layer are detected as coordinates in a case where rebars are stacked and arranged in a plurality of tiers. This enables the calculation control unit 19 to detect coordinates included in the measurement region R as coordinates of intersection points between the rebars 100 and the scan trajectory of the measurement light 23. Accordingly, point group data and the like obtained from other rebars or the ground which are not measurement objects can be excluded from coordinates of intersection points.

In step S808, the calculation control unit 19 determines whether or not coordinates of the pair of intersection points Pn have been detected in step S807, and when a positive determination is made, the calculation control unit 19 advances the processing to step S809 but when a negative determination is made, the calculation control unit 19 ends the processing of the present flow chart. The calculation control unit 19 makes a negative determination when no intersection points are detected or when only one intersection point is detected.

In step S809, the calculation control unit 19 calculates a movement vector Vn on the basis of the coordinates of the pair of intersection points Pn detected in step S807. The movement vector Vn is a vector of which an initial point is the center position Cn of the present scan and a terminal point is a center position Cn+1 of a scan to be performed next. As the movement vector Vn, the calculation control unit 19 calculates a vector that moves the center position Cn+1 of the scan to be performed next to an intersection point Pn on an upper side of the center position Cn. In this manner, the calculation control unit 19 controls a deflection operation of the deflecting unit 35 so that the center position Cn+1 of the scan to be performed next is arranged on a straight line connecting the coordinates of the pair of intersection points Pn.

While the calculation control unit 19 calculates, in step S809, a movement vector Vn on the basis of the coordinates of the pair of intersection points Pn detected in step S807 in the description provided above, other modes may be adopted instead. For example, when scanning a position where two rebars (for example, the rebar 100a and the rebar 100g) intersect each other and detecting four intersection points in step S803, the calculation control unit 19 may respectively calculate a direction in which the rebar 100a extends and a direction in which the rebar 100g extends from coordinates of the intersection points and calculate the movement vector Vn on the basis of the calculated directions.

In this case, as the movement vector Vn of the rebar 100a, the calculation control unit 19 calculates a vector of which an initial point is the center position Cn of the present scan and a terminal point is a point moved by a constant interval (D/2) to be described later in the calculated direction of the rebar 100a. In addition, as the movement vector Vn of the rebar 100g, the calculation control unit 19 calculates a vector of which an initial point is the center position Cn of the present scan and a terminal point is a point moved by a constant interval (D/2) to be described later in the calculated direction of the rebar 100g.

In step S810, the calculation control unit 19 changes a center position of a scan to the terminal point of the movement vector Vn calculated in step S809. The calculation control unit 19 calculates the horizontal angle θ1 and the vertical angle θ2 of a measurement point relative to the reference optical axis O so as to perform a scan around the terminal point of the movement vector Vn.

In step S811, the calculation control unit 19 changes a size of the ellipse (lengths of a major axis and a minor axis of the scan trajectory) of the measurement light 23 by the scan to be performed next to a suitable size. As shown in FIG. 11, the calculation control unit 19 changes the length of the major axis of the ellipse that is the scan trajectory so that the length of the major axis of the ellipse that is the scan trajectory at a position where the rebars 100 are arranged is a times (an arbitrary numerical value determined in advance that is larger than 1) a thickness E of the rebars 100. The calculation control unit 19 is assumed to calculate the thickness E of the rebars 100 on the basis of a plurality of measurement points SPn. In addition, the calculation control unit 19 sets a to, for example, a value equal to or larger than 5 and equal to or smaller than 10.

Figure 12:
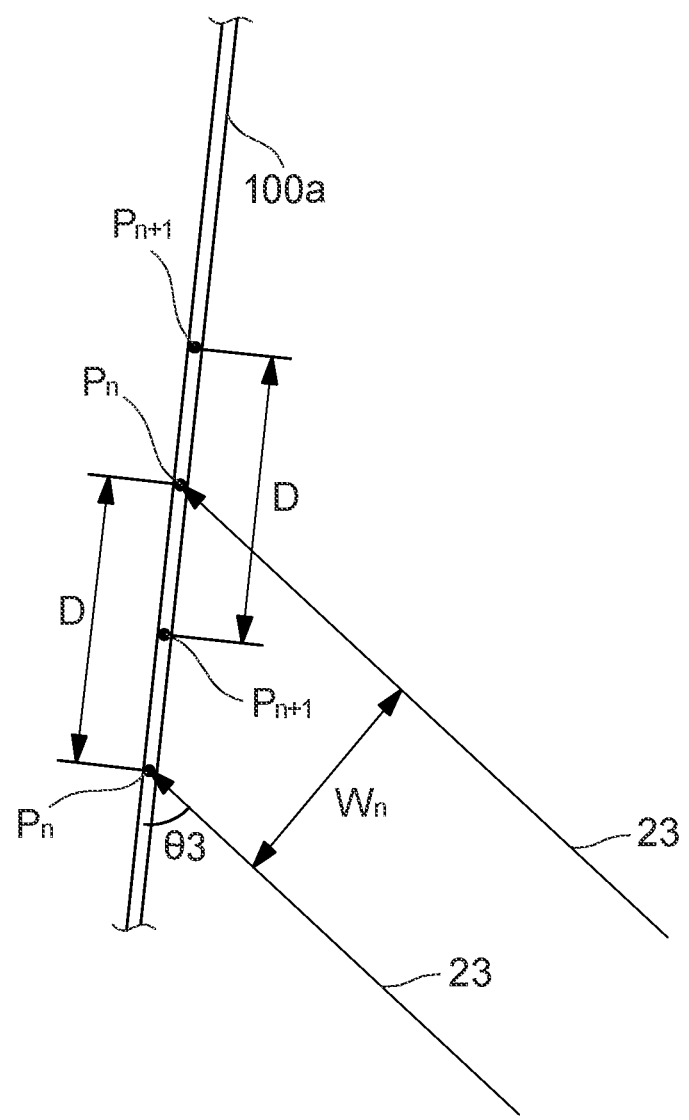
FIG. 12 is a diagram illustrating a calculation method of a length of a minor axis of an ellipse of measurement light.

A calculation method of the length of the minor axis of an ellipse of the measurement light 23 will now be described with reference to FIG. 12. FIG. 12 is a diagram in which the rebar 100a is viewed along the reference optical axis O in a similar manner to FIG. 5. The calculation control unit 19 according to the present embodiment adjusts a length of the minor axis of the elliptical scan trajectory of the measurement light 23 in order to make intervals of the intersection points Pn and Pn+1 that are adjacent to each other on the rebars 100 constant intervals.

When the intervals of the intersection points Pn and Pn+1 on the rebars 100 widen, scan density (point density) decreases and point group data with desired scan density can no longer be acquired from the rebars 100. In consideration thereof, the calculation control unit 19 according to the present embodiment adjusts the length of the minor axis of the scan trajectory of the measurement light 23 in accordance with an inclination angle θ3 formed between the pair of intersection points Pn and Pn+1 and the measurement light 23 so that the intervals of the intersection points Pn and Pn+1 that are adjacent to each other on the rebars 100 are constant intervals.

In FIG. 12, the interval between a pair of intersection points Pn on the rebars 100 is set to D. The calculation control unit 19 adjusts the length of the minor axis of the scan trajectory of the measurement light 23 to Wn so that the interval between the pair of intersection points Pn on the rebars 100 equals D. The length Wn of the minor axis satisfies Wn=D·sin(θ3), where the inclination angle θ3 is an angle formed by a straight line connecting the pair of intersection points Pn and a direction of emission of the measurement light 23.

By adjusting the length of the minor axis of the scan trajectory of the measurement light 23 to Wn in accordance with the inclination angle θ3, the calculation control unit 19 can make the intervals of the intersection points Pn and Pn+1 on the rebars 100 constant. The calculation control unit 19 calculates the inclination angle θ3 on the basis of the distance measurement data of the pair of intersection points Pn and calculates the length Wn of the minor axis of the scan trajectory of the measurement light 23. The calculation control unit 19 controls a deflection operation of the deflecting unit 35 on the basis of the inclination angle θ3 so that a length connecting the pair of intersection points Pn is kept constant at D. In FIG. 12, the intersection point Pn+1 is arranged at a midpoint of the pair of intersection points Pn. Therefore, the interval of the intersection points Pn and Pn+1 that are adjacent on the rebars 100 is a constant interval (D/2).

As described above, the calculation control unit 19 calculates the direction of emission (the horizontal angle θ1 and the vertical angle θ2) of the measurement light 23 so that the scan trajectory of the measurement light 23 assumes an elliptical shape with a direction connecting the pair of intersection points Pn as a minor axis. In addition, the calculation control unit 19 calculates the direction of emission (the horizontal angle θ1 and the vertical angle θ2) of the measurement light so that the minor axis equals the length Wn in accordance with the inclination angle θ3 formed between a straight line connecting the pair of intersection points Pn and the measurement light 23. As described above, the calculation control unit 19 controls a deflection operation of the deflecting unit 35 so that intervals of adjacent intersection points are constant intervals (D/2) on the rebars 100 even when the inclination angle 83 formed between a straight line connecting the pair of intersection points Pn and the measurement light 23 changes.

In step S812, the calculation control unit 19 determines whether or not the measurement of the rebars 100 is to be ended, and when a positive determination is made, the calculation control unit 19 ends the processing of the present flow chart, but when a negative determination is made, the calculation control unit 19 once again executes the processing of step S805 and thereafter. By repetitively executing the processing of steps S805 to S811, the calculation control unit 19 continuously acquires point group data of the rebars 100 from the measurement start point Pst. In step S812, the calculation control unit 19 makes a determination of NO when, for example, the coordinates of the intersection point detected in step S807 is separated from the survey system 1 by a predetermined distance or more. In addition, for example, the calculation control unit 19 makes a determination of NO when the inclination angle θ3 shown in FIG. 12 equals or falls below a predetermined angle.

Figure 13:
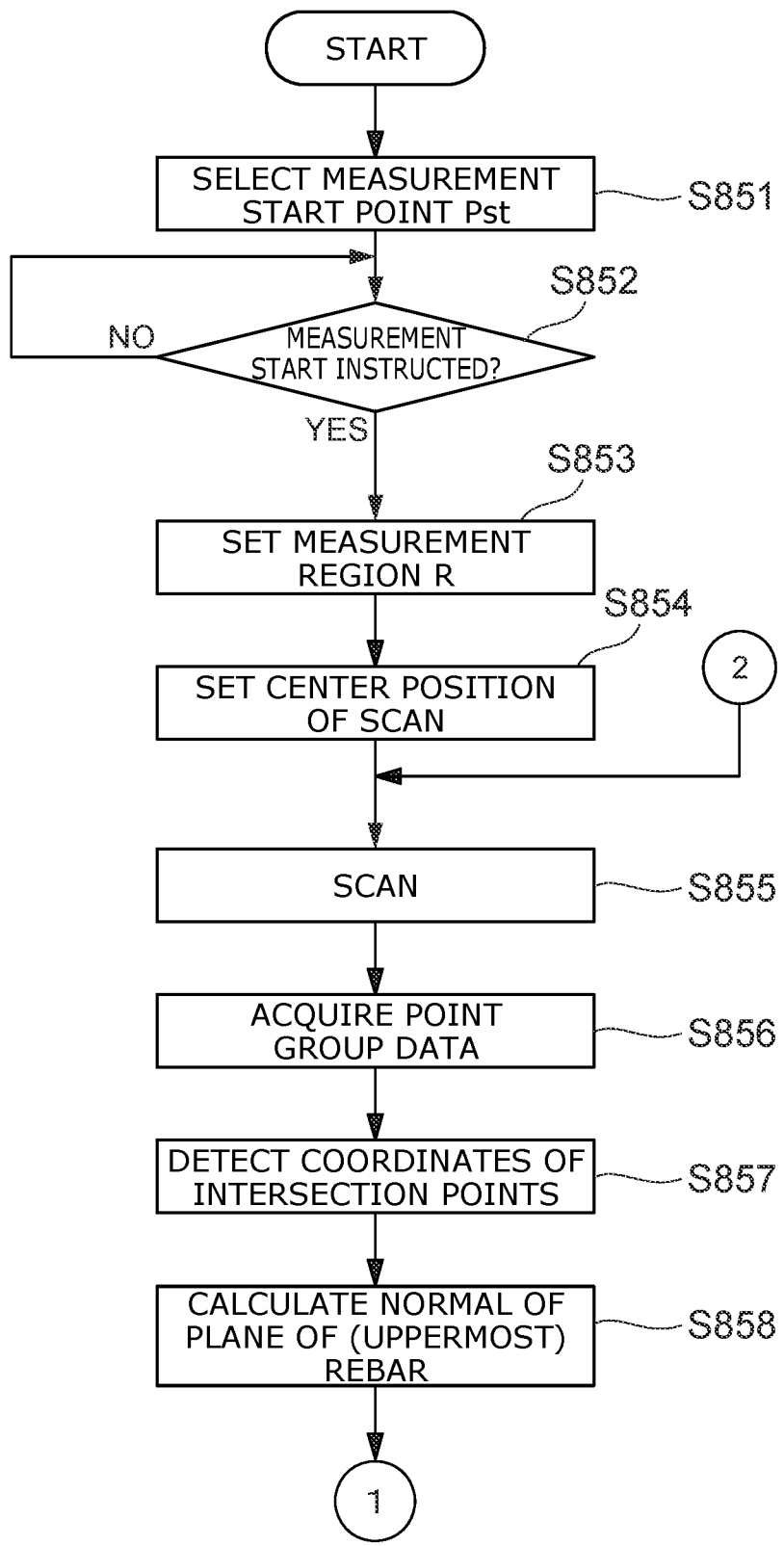
FIG. 13 is a flow chart showing a modification of processing executed by the calculation control unit.
Figure 14:
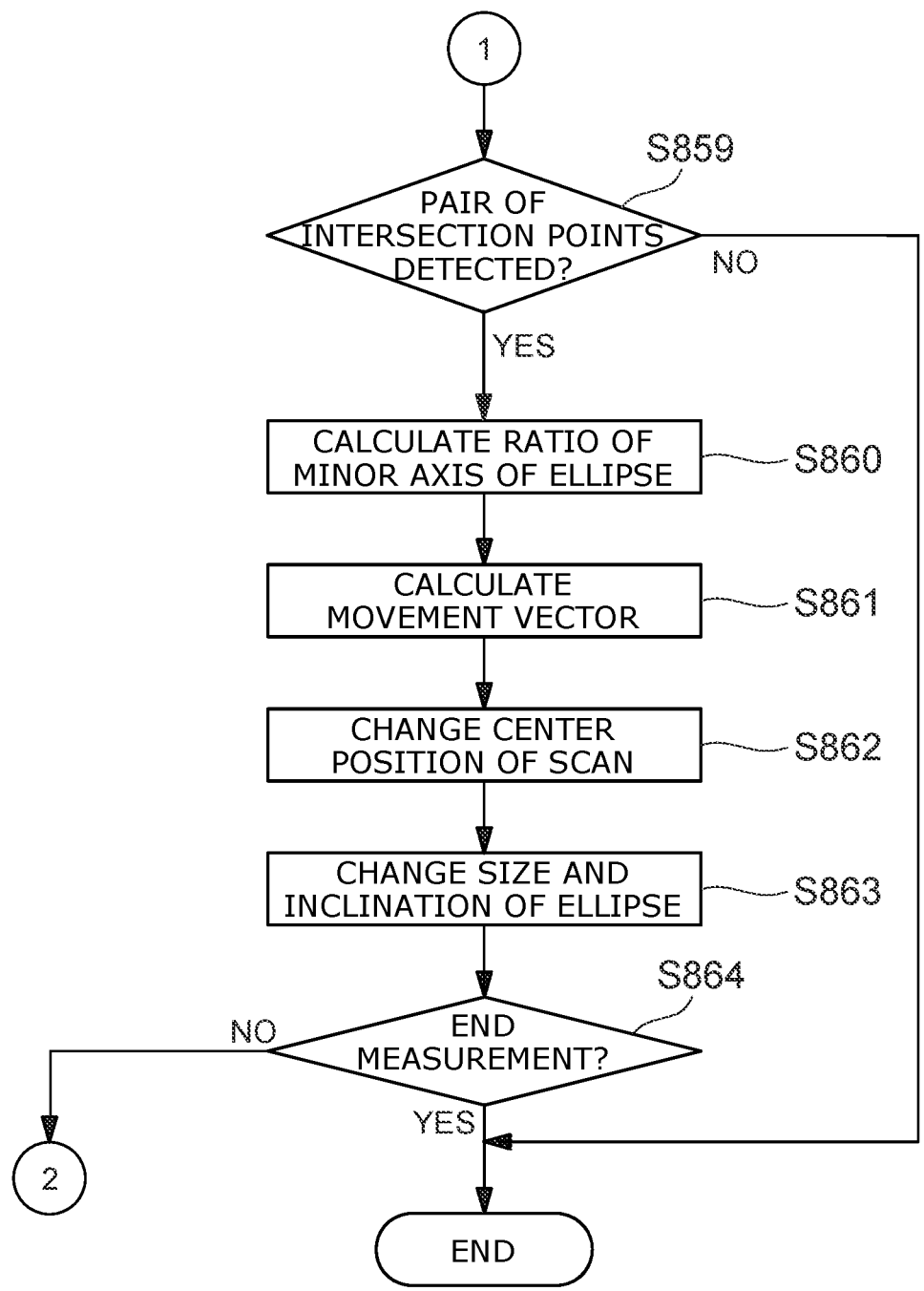
FIG. 14 is a flow chart showing a modification of processing executed by the calculation control unit.

Next, a modification of processing executed by the calculation control unit 19 will be described with reference to FIGS. 13 to 17. FIGS. 13 and 14 are flow charts showing a modification of the processing executed by the calculation control unit 19. It should be noted that, when the processing executed by the calculation control unit 19 according to the present modification is similar to the processing executed by the calculation control unit 19 according to the present embodiment described earlier with reference to FIGS. 8 to 12, overlapping descriptions will be omitted when appropriate and, hereinafter, differences will be mainly described.

In the example of processing described above with reference to FIGS. 8 to 12, the calculation control unit 19 calculates the direction of emission (the horizontal angle θ1 and the vertical angle θ2) of the measurement light 23 so that the scan trajectory of the measurement light 23 assumes an elliptical shape with a direction connecting the pair of intersection points Pn as a minor axis. In contrast, in the processing according to the present modification, the calculation control unit 19 calculates the direction of emission (the horizontal angle θ1 and the vertical angle θ2) of the measurement light 23 so that the scan trajectory of the measurement light 23 assumes an elliptical shape of which a minor axis is a normal direction of a plane including the uppermost rebar 100 that is a measurement object (hereinafter, referred to as a "plane of the rebars 100" for the sake of brevity of description). The processing according to the present modification differs from the processing described earlier with reference to FIGS. 8 to 12 in this regard.

In other words, as described earlier with reference to FIGS. 5 to 7, the plurality of rebars 100 (100a, 100b, 100c, 100d, and 100e) which extend in the first direction are arranged parallel to each other at intervals in the second direction that is orthogonal to the first direction. Therefore, as described earlier, a plane exists which includes the plurality of rebars 100 (100a, 100b, 100c, 100d, and 100e) which are arranged at predetermined intervals.

Figure 15:
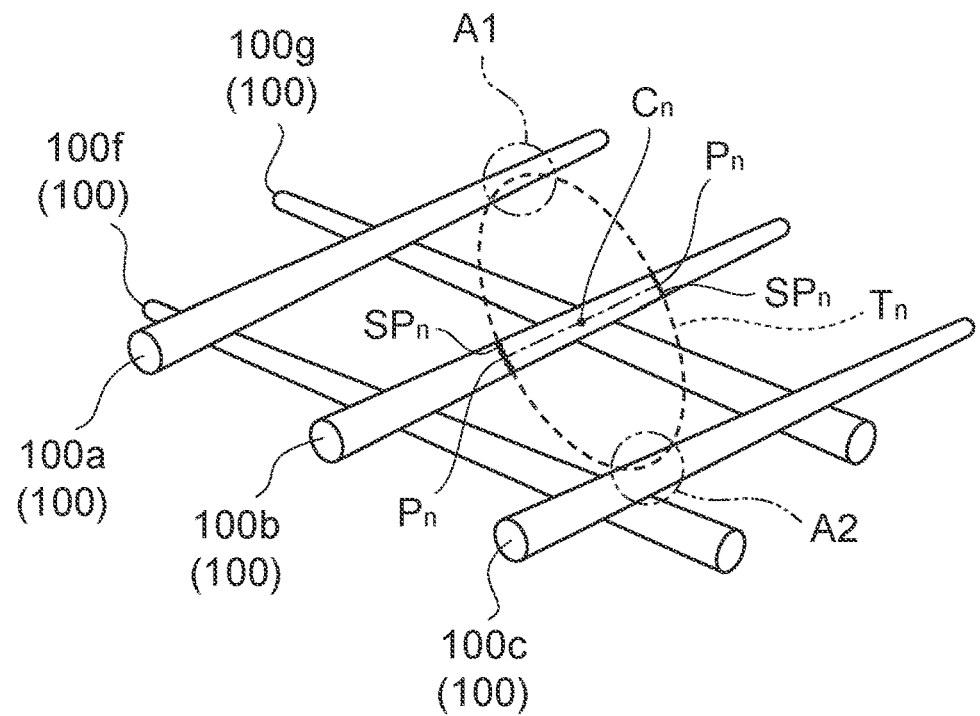
FIG. 15 is a diagram showing a state where rebars are scanned.

In this case, when the scan trajectory of the measurement light 23 is set so as to assume an elliptical shape with a direction connecting the pair of intersection points Pn as a minor axis, depending on a length of the major axis of a scan trajectory Tn (an elliptical shape) of the measurement light 23, ends in a major axis direction of the scan trajectory Tn of the measurement light 23 may overlap the rebars 100a and 100c that are adjacent to the rebar 100b as in areas A1 and A2 represented in FIG. 15. FIG. 15 is a diagram in which the rebars 100 are viewed along the reference optical axis O in a similar manner to FIG. 5. In the example represented in FIG. 15, the calculation control unit 19 is to acquire point group data of the rebars 100a and 100c other than the rebar 100b that is a measurement object. Accordingly, a direction of the movement vector Vn may deviate from a direction in which the rebar 100b that is a measurement object extends. As a result, a state where the center of the scan trajectory of the measurement light 23 tracks the rebar 100b that is a measurement object is sometimes unmaintainable. This becomes apparent in cases where an angle formed between the direction of emission of the measurement light 23 and the plane of the rebars 100 is relatively small. More preferably, in order to more accurately set the direction of the movement vector Vn along the direction in which the rebar 100*b* that is a measurement object extends, point group data (noise) of the rebars 100*a* and 100*c* other than the rebar 100*b* that is a measurement object is excluded.

Figure 16:
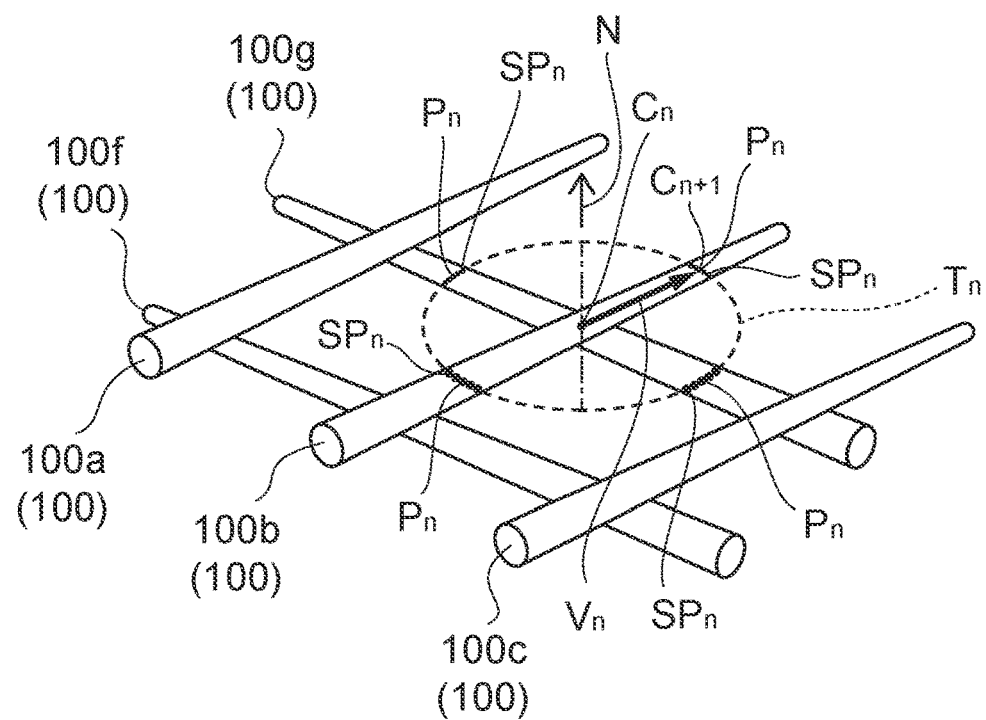
FIG. 16 is a diagram showing a state where rebars are scanned.

In consideration thereof, in the present modification, as represented in FIG. 16, the calculation control unit 19 calculates the direction of emission (the horizontal angle θ1 and the vertical angle θ2) of the measurement light 23 so that the scan trajectory Tn of the measurement light 23 assumes a circular shape on the plane of the rebars 100. FIG. 16 is a diagram in which the rebars 100 are viewed along the reference optical axis O in a similar manner to FIG. 5. As represented in FIG. 16, by calculating the direction of emission (the horizontal angle θ1 and the vertical angle θ2) of the measurement light 23 so that the scan trajectory Tn of the measurement light 23 assumes an elliptical shape with a normal direction N of an apparent plane of the rebars 100 as a minor axis, the calculation control unit 19 can set the scan trajectory Tn of the measurement light 23 to a circular shape on the plane of the rebars 100. This will be described in greater detail with reference to FIGS. 13 and 14.

First, processing of steps S851 to S857 is the same as the processing of steps S801 to S807 described earlier with reference to FIG. 8. Next, in step S858, the calculation control unit 19 calculates a normal N (refer to FIG. 17) of the apparent plane of the uppermost rebar 100. For example, based on point group data in the measurement region R stored in the first storage unit 20, the calculation control unit 19 calculates a parameter of the apparent plane of the uppermost rebar 100 and calculates the normal N. Processing of step S859 following step S858 is similar to the processing of step S808 described earlier with reference to FIG. 8.

Figure 17:
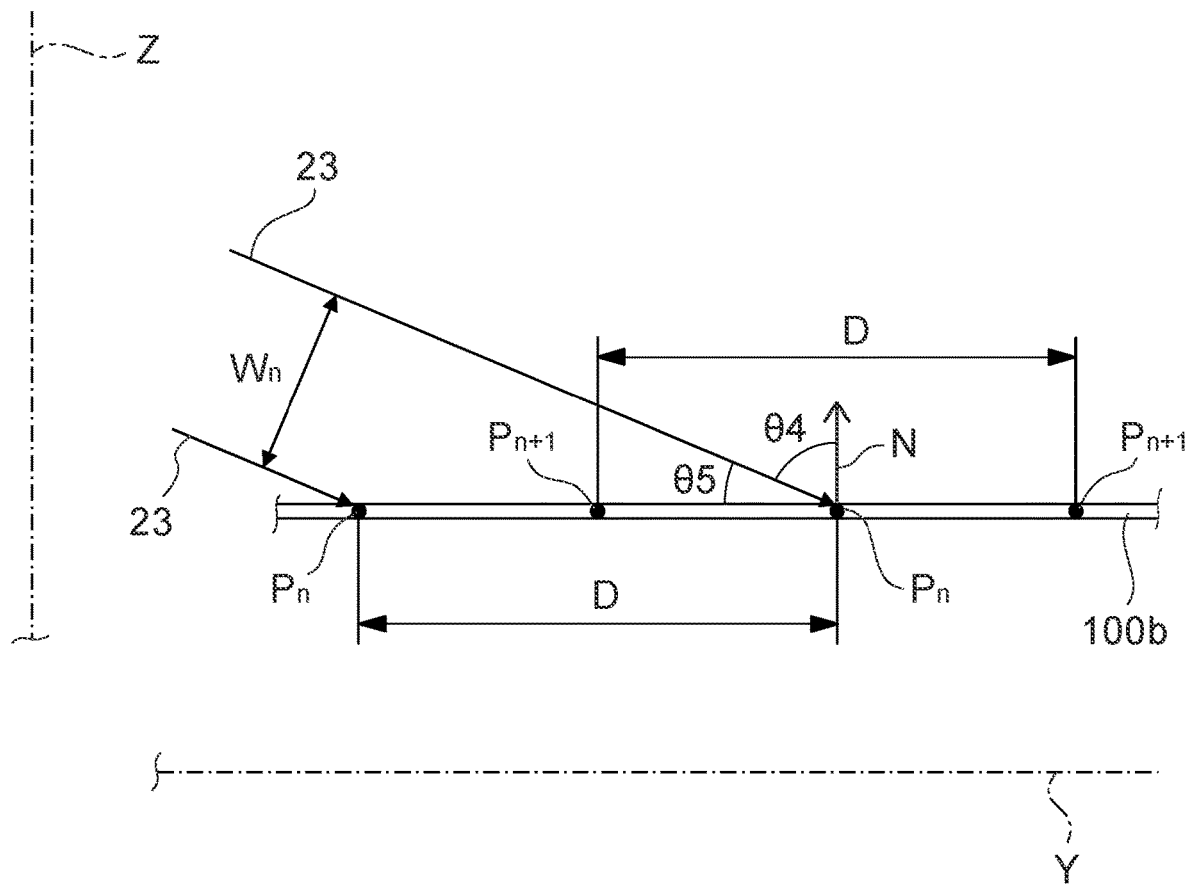
FIG. 17 is a diagram illustrating a calculation method of a ratio of a minor axis of an ellipse of measurement light.

Next, in step S860, a ratio (length) of a minor axis of an ellipse representing the scan trajectory Tn of the measurement light 23 is calculated. A calculation method of the ratio of the minor axis of the ellipse of the measurement light 23 will now be described with reference to FIG. 17. FIG. 17 is a Y-Z plan view showing, from the side, the rebar 100*b* shown in FIG. 16. First, on the Y-Z plane, the calculation control unit 19 calculates an angle θ4 formed between the normal N of the plane of the rebars 100 calculated in step S858 and the direction of emission of the measurement light 23. In addition, on the Y-Z plane, the calculation control unit 19 calculates an angle θ5 formed between the plane of the rebars 100 and the direction of emission of the measurement light 23 by subtracting the angle θ4 from 90 degrees.

In FIG. 17, the interval between a pair of intersection points Pn on the rebars 100 is set to D in a similar manner to the example shown in FIG. 12. The calculation control unit 19 adjusts the length of the minor axis of the scan trajectory Tn of the measurement light 23 to Wn so that the interval between the pair of intersection points Pn on the rebars 100 equals D. The length of the minor axis satisfies Wn=D·sin(θ5).

In this manner, by calculating the direction of emission (the horizontal angle θ1 and the vertical angle θ2) of the measurement light 23 so that the scan trajectory Tn of the measurement light 23 assumes an elliptical shape with a normal direction N of an apparent plane of the rebars 100 as a minor axis, the calculation control unit 19 sets the scan trajectory Tn of the measurement light 23 to a circular shape on the plane of the rebars 100. In addition, the calculation control unit 19 calculates the direction of emission (the horizontal angle θ1 and the vertical angle θ2) of the measurement light so that the minor axis equals the length Wn in accordance with the inclination angle θ5 formed between the plane of the rebars 100 and the direction of emission of the measurement light 23. As described above, the calculation control unit 19 controls a deflection operation of the deflecting unit 35 so that intervals of adjacent intersection points are constant intervals (D/2) on the rebars 100 even when the inclination angle θ5 formed between the plane of the rebars 100 and the direction of emission of the measurement light 23 changes.

Processing of steps S861 and S862 following step S860 is similar to the processing of steps S809 and S810 described earlier with reference to FIG. 9. Next, in step S863, the calculation control unit 19 changes a size (lengths of a major axis and a minor axis of the scan trajectory) and an inclination of the ellipse of the measurement light 23 by the scan to be performed next to a suitable size and a suitable inclination. In other words, the calculation control unit 19 changes the direction of emission (the horizontal angle θ1 and the vertical angle θ2) of the measurement light 23 so that the scan trajectory Tn of the measurement light 23 assumes an elliptical shape with a normal direction N of an apparent plane of the rebars 100 as a minor axis. In addition, the calculation control unit 19 changes the direction of emission (the horizontal angle θ1 and the vertical angle θ2) of the measurement light 23 so that the minor axis equals the length Wn in accordance with the inclination angle θ5 formed between the plane of the rebars 100 and the direction of emission of the measurement light 23. Processing of step S864 following step S863 is similar to the processing of step S812 described earlier with reference to FIG. 9.

According to the present modification, the calculation control unit 19 can be prevented from acquiring point group data of the rebars 100*a* and 100*c* other than the rebar 100*b* that is a measurement object. For example, as represented in FIG. 16, even when scanning a position where two orthogonal rebars (in FIG. 16, the rebar 100*b* and the rebar 100*g*) intersect each other, locations where the scan trajectory Tn of the measurement light 23 and the rebars 100 intersect each other can be kept to four locations. In addition, the calculation control unit 19 can readily recognize that locations where the scan trajectory Tn of the measurement light 23 and rebars other than the rebar 100*b* that is a measurement object intersect each other are two locations on the rebar 100*g* that is orthogonal to the rebar 100*b* that is a measurement object. Therefore, the calculation control unit 19 can readily exclude point group data (noise) of rebars other than the rebar 100*b* that is a measurement object. Accordingly, a state where the center of the scan trajectory of the measurement light 23 tracks the rebar 100*b* that is a measurement object can be more reliably maintained.

Figure 18:
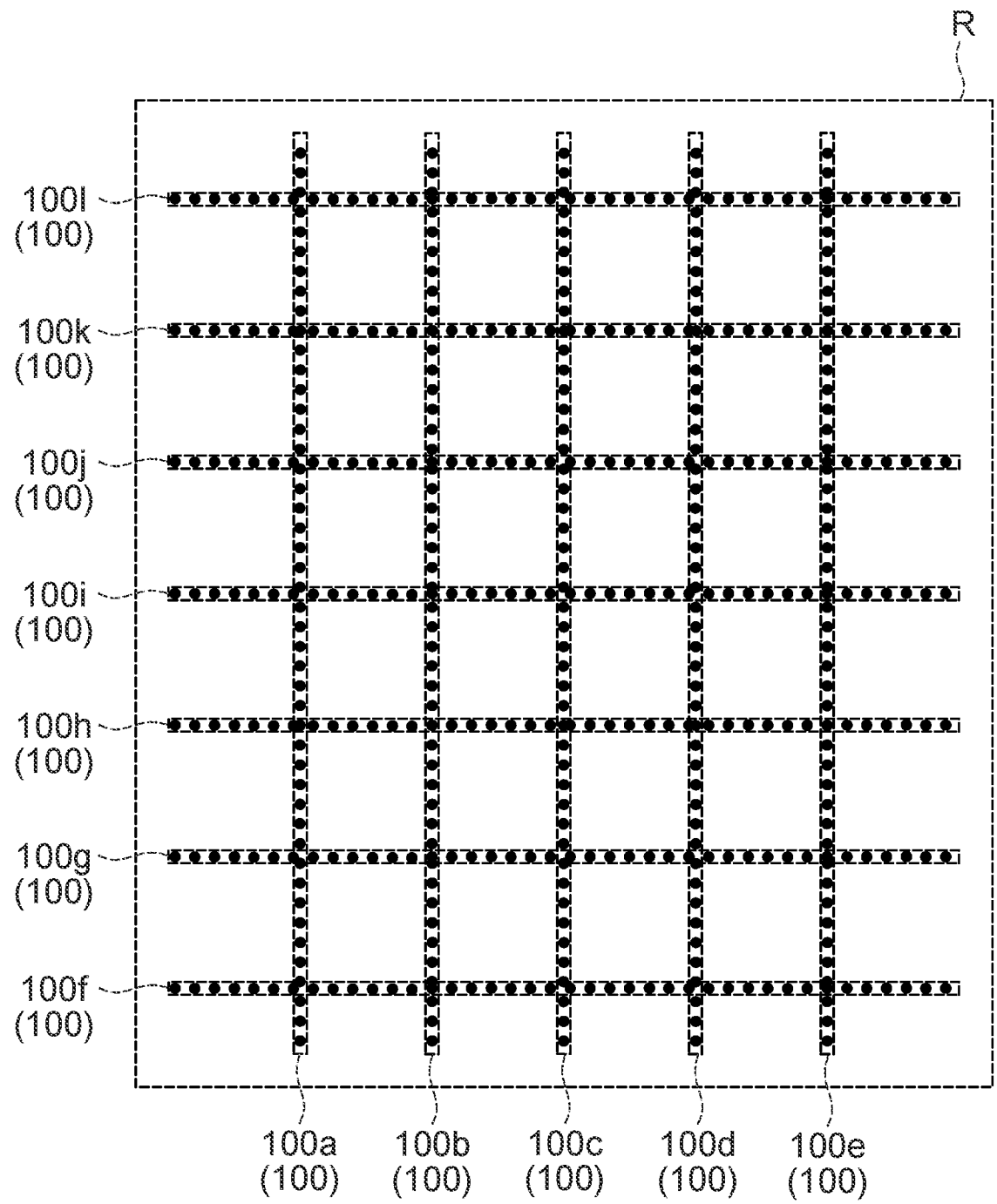
FIG. 18 is a diagram showing a measurement result of rebars.

FIG. 18 is a diagram showing a measurement result of the rebars 100. FIG. 18 represents coordinates of intersection points being plotted in a three-dimensional space defined by an axis X, an axis Y, and an axis Z and shows a state where the measurement region R in the three-dimensional space is viewed from a normal direction. Black points shown in FIG. 18 represent plotted coordinates. As shown in FIG. 18, intervals of the intersection points on the rebars 100 as obtained by the survey system 1 according to the present embodiment are constant intervals.

Figure 19:
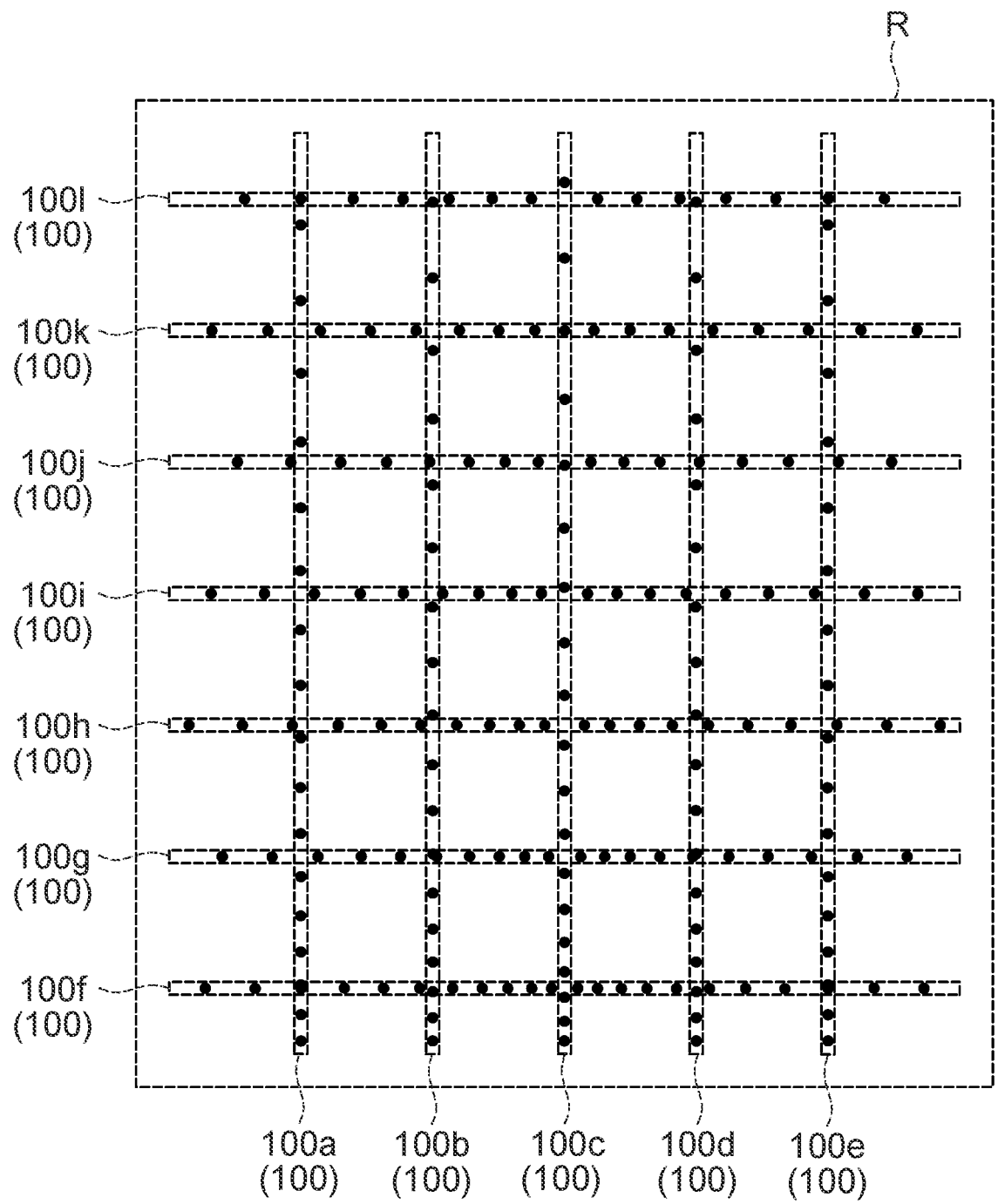
FIG. 19 is a diagram showing a comparative example of a measurement result of rebars.

FIG. 19 is a diagram showing a comparative example of a measurement result of the rebars 100. The comparative example is an example in which a scan by the measurement light 23 is performed with a scan trajectory that is an ellipse of a constant size without changing the size of the ellipse in step S811 shown in FIG. 9 and without changing the size and the inclination of the ellipse in step S863 shown in FIG. 14. FIG. 19 represents coordinates of intersection points being plotted in a three-dimensional space defined by an axis X, an axis Y, and an axis Z and shows a state where the measurement region R in the three-dimensional space is viewed from a normal direction. Black points shown in FIG. 19 represent plotted coordinates.

As shown in FIG. 19, intervals of the intersection points on the rebars 100 as obtained by the survey system according to the comparative example are not constant intervals. As shown in FIG. 19, intervals of the intersection points in a depth direction widen from a proximal side (a lower side in FIG. 19) in the depth direction toward a distal side (an upper side in FIG. 19) in the depth direction. In addition, as shown in FIG. 19, intervals of the intersection points in a width direction widen from a center in the width direction toward ends in the width direction. Therefore, point density of the intersection points is highest on the proximal side in the depth direction and at the center in the width direction and, the farther away therefrom, the lower the point density of the intersection points.

Operational advantages of the survey system 1 according to the present embodiment described above will now be described.

With the survey system 1 according to the present embodiment, coordinates of intersection points of the rebars 100 which are measurement objects formed in a linear shape and a scan trajectory of the measurement light 23 are detected by the calculation control unit 19 on the basis of a distance measurement result by the distance measuring unit 3A and a direction of emission that is deflected by the deflecting unit 35. In addition, the calculation control unit 19 controls a deflection operation of the deflecting unit 35 so that intervals of the intersection points adjacent to each other are constant intervals on the rebars 100. Since intervals on the rebars 100 between intersection points of which coordinates are detected are constant intervals, coordinates of the rebars 100 can be obtained at constant point density regardless of the distance from the survey system 1 to the rebars 100. Therefore, coordinates of each position of the rebars 100 can be efficiently and accurately detected.

In addition, with the survey system 1 according to the present embodiment, the rebars 100 are formed so as to extend in a linear shape, and the calculation control unit 19 controls a deflection operation of the deflecting unit 35 so that the prescribed center is arranged on a straight line connecting a pair of the intersection points of the rebars 100 and the scan trajectory of the measurement light 23.

With the survey system 1 according to the present embodiment, a deflection operation of the deflecting unit 35 is controlled so that the prescribed center is arranged on a straight line connecting a pair of the intersection points of the rebars 100 and the scan trajectory of the measurement light 23. Therefore, a state where a center of the scan trajectory of the measurement light 23 tracks the rebars 100 can be reliably maintained.

Furthermore, in the survey system 1 according to the present embodiment, the calculation control unit 19 controls a deflection operation of the deflecting unit 35 so that a scan trajectory of the measurement light 23 has an elliptical shape with a minor axis in a direction connecting the pair of intersection points and, at the same time, the minor axis has a length in accordance with an inclination angle formed between a straight line connecting the pair of intersection points and the measurement light 23.

With the survey system 1 according to the present embodiment, since the minor axis of the elliptical shape that is the scan trajectory of the measurement light 23 has a length in accordance with an inclination angle formed between a straight line connecting the pair of intersection points and the measurement light 23, intervals of adjacent intersection points can be made constant intervals on the rebars 100 regardless of an inclination angle formed between the direction of emission of the measurement light 23 and the direction in which the rebars 100 extend.

Furthermore, in the survey system 1 according to the present embodiment, the calculation control unit 19 controls a deflection operation of the deflecting unit 35 so that a scan trajectory of the measurement light 23 has an elliptical shape with a minor axis in a direction of a normal N of an apparent plane including the rebars 100 and, at the same time, the minor axis has a length in accordance with an inclination angle formed between the plane including the rebars 100 and the measurement light 23.

With the survey system 1 according to the present embodiment, since the scan trajectory of the measurement light 23 is set to a circular shape on the plane including the rebars 100, the measurement light 23 can be prevented from irradiating rebars 100 (for example, the rebars 100a and 100c) other than the rebar 100 (for example, the rebar 100b) that is a measurement object. Accordingly, a distance measurement result of the rebars 100 other than the rebar 100 that is a measurement object can be readily excluded and a state where a center of the scan trajectory of the measurement light 23 tracks the rebar 100 that is a measurement object can be more reliably maintained.

In the survey system 1 according to the present embodiment, the rebars 100 include a first rebar 100 that extends in a linear shape in a first direction and a second rebar 100 that extends in a linear shape in a second direction orthogonal to the first direction, the first rebar 100 and the second rebar 100 are adjacently arranged in a quadrille pattern, and the calculation control unit 19 sets an approximately planer measurement region R including the first rebar 100 and the second rebar 100, and detects coordinates included in the measurement region R as coordinates of an intersection point of the rebars 100 and the measurement light 23.

According to the survey system 1 according to the present embodiment, coordinates included in an approximately planer measurement region R including the first rebar 100 with a linear shape and the second rebar 100 with a linear shape being arranged in a quadrille pattern are detected as coordinates of an intersection point but coordinates not included in the measurement region R are not detected as coordinates of an intersection point. Therefore, a structure other than the rebar 100 that is a measurement object (for example, another rebar that is arranged below the uppermost rebar 100 that is the measurement object) is never detected as coordinates of an intersection point. Accordingly, only coordinates obtained from an intersection point with the rebars 100 can be reliably detected as the coordinates of the intersection point.

An embodiment of the present invention has been described above. However, it is to be understood that the present invention is not limited to the embodiment described above and that various modifications can be made without departing from the scope of the appended claims. The configurations of the embodiment described above can be partially omitted or arbitrarily combined in manners that differ from those described above.

While a rebar is described as a measurement object in the description provided above, other modes may be adopted as long as the measurement object is formed in a linear shape.

While the deflecting unit 35 is constituted by the pair of optical prisms 36a and 36b in the description provided above, other modes may be adopted. For example, a similar function to the pair of optical prisms 36a and 36b may be achieved using a two-axis galvanometer mirror.

REFERENCE SIGNS LIST

1 Survey system
3 Laser scanner
3A Distance measuring unit
11 Measurement light emitting unit
12 Light receiving unit
13 Distance measurement calculating unit
15 Emission direction detecting unit
17 Attitude detecting unit
20 First storage unit
23 Measurement light
24 Reflected measurement light
27 Light emitting element
33 Light receiving element
35 Deflecting unit
100 Rebar
O Reference optical axis
Pn Intersection point
R Measurement region
Spn Measurement point
Tn Scan trajectory
Vn Movement vector
X, Y, Z Axis
θ1 Horizontal angle
θ2 Vertical angle
θ3 Inclination angle
θ4 Angle
θ5 Inclination angle

The invention claimed is:

1. A measurement device, comprising:
a distance measuring unit having a light producing element which produces measurement light, a measurement light emitting unit which emits the measurement light, a light receiving unit which receives reflected measurement light, and a light receiving element which receives the reflected measurement light and generates a light reception signal, the distance measuring unit performing a distance measurement of a measurement object on the basis of a light reception signal from the light receiving element;
a deflecting unit which deflects a direction of emission of the measurement light with respect to a reference optical axis and which is capable of performing a scan with the measurement light with respect to a prescribed center in a circumferential direction; and
a control unit which controls the distance measuring unit and the deflecting unit, wherein the control unit detects coordinates of intersection points of the measurement object that is formed in a linear shape and a scan trajectory of the measurement light on the basis of a distance measurement result by the distance measuring unit and the direction of emission that is deflected by the deflecting unit, and controls a deflection operation of the deflecting unit so that intervals of the intersection points adjacent to each other are constant intervals on the measurement object.

2. The measurement device according to claim 1, wherein the measurement object is formed so as to extend in a linear shape, and
the control unit controls the deflection operation of the deflecting unit so that the prescribed center is arranged on a straight line connecting a pair of the intersection points of the measurement object and the scan trajectory of the measurement light.

3. The measurement device according to claim 1, wherein the control unit controls the deflection operation of the deflecting unit so that a scan trajectory of the measurement light has an elliptical shape with a minor axis in a direction connecting the pair of intersection points and, at the same time, the minor axis has a length in accordance with an inclination angle formed between a straight line connecting the pair of intersection points and the measurement light.

4. The measurement device according to claim 1, wherein the control unit controls the deflection operation of the deflecting unit so that a scan trajectory of the measurement light has an elliptical shape with a minor axis being a normal direction of an apparent plane including the measurement object and, at the same time, the minor axis has a length in accordance with an inclination angle formed between the plane including the measurement object and the measurement light.

5. The measurement device according to claim 1, wherein
the measurement object includes a first measurement object that extends in a linear shape in a first direction and a second measurement object that extends in a linear shape in a second direction orthogonal to the first direction,
the first measurement object and the second measurement object are adjacently arranged in a quadrille pattern, and
the control unit sets an approximately planer region including the first measurement object and the second measurement object, and detects coordinates included in the region as coordinates of an intersection point of the measurement object and the measurement light.

6. A method for controlling a measurement device which performs a measurement of a measurement object,
the measurement device including:
a distance measuring unit having a light producing element which produces measurement light, a measurement light emitting unit which emits the measurement light, a light receiving unit which receives reflected measurement light, and a light receiving element which receives the reflected measurement light and generates a light reception signal; and
a deflecting unit which deflects a direction of emission of the measurement light with respect to a reference optical axis and which is capable of performing a scan with the measurement light with respect to a prescribed center in a circumferential direction,
the method comprising:
a distance measurement step of performing a distance measurement of the measurement object on the basis of a light reception signal from the light receiving element;
an intersection point detection step of detecting coordinates of intersection points of the measurement object that is formed in a linear shape and a scan trajectory of the measurement light on the basis of a distance measurement result in the distance measurement step and the direction of emission that is deflected by the deflecting unit; and
a control step of controlling a deflection operation of the deflecting unit so that intervals of the intersection points adjacent to each other are constant intervals on the measurement object.

7. The measurement device according to claim 2, wherein the control unit controls the deflection operation of the deflecting unit so that a scan trajectory of the measurement light has an elliptical shape with a minor axis in a direction connecting the pair of intersection points and, at the same time, the minor axis has a length in accordance with an inclination angle formed between a straight line connecting the pair of intersection points and the measurement light.

8. The measurement device according to claim 2, wherein the control unit controls the deflection operation of the deflecting unit so that a scan trajectory of the measurement light has an elliptical shape with a minor axis being a normal direction of an apparent plane including the measurement object and, at the same time, the minor axis has a length in accordance with an inclination angle formed between the plane including the measurement object and the measurement light.

9. The measurement device according to claim 3, wherein
the measurement object includes a first measurement object that extends in a linear shape in a first direction and a second measurement object that extends in a linear shape in a second direction orthogonal to the first direction,
the first measurement object and the second measurement object are adjacently arranged in a quadrille pattern, and
the control unit sets an approximately planer region including the first measurement object and the second measurement object, and detects coordinates included in the region as coordinates of an intersection point of the measurement object and the measurement light.

10. The measurement device according to claim 4, wherein
the measurement object includes a first measurement object that extends in a linear shape in a first direction and a second measurement object that extends in a linear shape in a second direction orthogonal to the first direction,
the first measurement object and the second measurement object are adjacently arranged in a quadrille pattern, and
the control unit sets an approximately planer region including the first measurement object and the second measurement object, and detects coordinates included in the region as coordinates of an intersection point of the measurement object and the measurement light.

11. The measurement device according to claim 7, wherein
the measurement object includes a first measurement object that extends in a linear shape in a first direction and a second measurement object that extends in a linear shape in a second direction orthogonal to the first direction,
the first measurement object and the second measurement object are adjacently arranged in a quadrille pattern, and
the control unit sets an approximately planer region including the first measurement object and the second measurement object, and detects coordinates included in the region as coordinates of an intersection point of the measurement object and the measurement light.

12. The measurement device according to claim 8, wherein
the measurement object includes a first measurement object that extends in a linear shape in a first direction and a second measurement object that extends in a linear shape in a second direction orthogonal to the first direction,
the first measurement object and the second measurement object are adjacently arranged in a quadrille pattern, and
the control unit sets an approximately planer region including the first measurement object and the second measurement object, and detects coordinates included in the region as coordinates of an intersection point of the measurement object and the measurement light.

\* \* \* \* \*